US012638464B2

(12) United States Patent
Rekow et al.

(10) Patent No.: US 12,638,464 B2
(45) Date of Patent: May 26, 2026

(54) ANALYZING APPARATUS WITH A MOTOR AND A CAM DISK AND ANALYZING PROCESS USING SUCH ANALYZING APPARATUS

(71) Applicant: Dräger Safety AG & Co. KGaA, Lübeck (DE)

(72) Inventors: Jens Rekow, Lübeck (DE); Malte Baesler, Lübeck (DE); Tobias Reier, Lübeck (DE); Luis Brunswick Franco, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 534 days.

(21) Appl. No.: 18/330,493

(22) Filed: Jun. 7, 2023

(65) Prior Publication Data

US 2023/0400476 A1     Dec. 14, 2023

(30) Foreign Application Priority Data

Jun. 8, 2022   (DE) ..................... 10 2022 114 344.9

(51) Int. Cl.
G01N 35/02          (2006.01)
G01N 35/00          (2006.01)
G01N 35/10          (2006.01)

(52) U.S. Cl.
CPC ....... *G01N 35/025* (2013.01); *G01N 35/0099* (2013.01); *G01N 35/1011* (2013.01); *G01N 35/1016* (2013.01)

(58) Field of Classification Search
CPC ............. G01N 1/24; G01N 2001/2244; G01N 2001/241; G01N 33/4972; G01N 35/0099;
(Continued)

(56) References Cited

U.S. PATENT DOCUMENTS 3,622,278 A    11/1971  Elzinga et al.
4,141,689 A     2/1979  Bergman
(Continued)

FOREIGN PATENT DOCUMENTS

CN         114460030 A      5/2022
DE          2702516 A1      8/1977
(Continued)

OTHER PUBLICATIONS

Zhang et al. "Introduction to Mechanisms: Chapter 6 Cams". [retrieved from internet on Mar. 20, 2024].

*Primary Examiner* — Jennifer Wecker
(74) *Attorney, Agent, or Firm* — McGlew and Tuttle, P.C.

(57) ABSTRACT

An analyzer (100) and a process for analyzing a gas (G) for a predetermined substance. A sensor measures an indicator of the amount or concentration of the substance in a gas sample located in a measuring chamber (3). A movement of an actuating unit (4, 17, 19) in a first direction (R.1) increases the volume of a suction chamber unit (5). A movement of the actuating unit (4, 17, 19) in a second direction (R.2) decreases the volume of the suction chamber unit (5). A motor (7) rotates a cam disk (1) about an axis (MA). The actuating unit (4, 17, 19) is mechanically coupled to the cam disk (1). Each rotational position of the cam disk (1) relative to the axis (MA) determines a position of the actuating unit (4, 17, 19) and thus a volume of the suction chamber unit (5).

15 Claims, 15 Drawing Sheets

(58) Field of Classification Search
CPC ............ G01N 35/025; G01N 35/1011; G01N 35/1016; A61B 5/097; A61B 5/4845
See application file for complete search history.

(56) References Cited

U.S. PATENT DOCUMENTS

| | | | |
|---|---|---|---|
| 4,297,871 A | 11/1981 | Wright et al. | |
| 4,976,135 A | 12/1990 | Stock | |
| 5,117,674 A | 6/1992 | Howard | |
| 7,329,390 B2 | 2/2008 | Stock et al. | |
| 7,603,886 B2 | 10/2009 | Stock | |
| 7,993,281 B2 | 8/2011 | Stock et al. | |
| 2006/0204997 A1* | 9/2006 | Macioszek ........... | C12Q 1/6813 |
| | | | 435/6.15 |
| 2017/0052205 A1* | 2/2017 | Silbert ............... | G01N 35/0099 |
| 2023/0324263 A1 | 10/2023 | Rekow et al. | |

FOREIGN PATENT DOCUMENTS

| | | | |
|---|---|---|---|
| DE | 3904994 A1 | 8/1990 |
| EP | 0302681 A2 | 2/1989 |

* cited by examiner (State of the Art)

ANALYZING APPARATUS WITH A MOTOR AND A CAM DISK AND ANALYZING PROCESS USING SUCH ANALYZING APPARATUS

CROSS REFERENCE TO RELATED APPLICATIONS

This application claims the benefit of priority under 35 U.S.C. § 119 of German Application 10 2022 114 344.9, filed Jun. 8, 2022, the entire contents of which are incorporated herein by reference.

TECHNICAL FIELD

The invention relates to an analyzer and an analyzing process for analyzing a gas for at least one predetermined substance.

BACKGROUND

Such an analyzer can be used, for example, to check whether or not a subject (in general a human being) has ingested alcohol, in particular ethyl alcohol (ethanol) and optionally admixtures of other alcohols. If the subject has consumed alcohol and this alcohol has not yet been completely broken down, the subject's blood contains alcohol and therefore the air exhaled by the subject contains breath alcohol. Optionally, such an analyzer can be used to determine how large the breath alcohol concentration is in the subject's breath, and from this value the content of alcohol in the subject's blood can be deduced. The analyzer examines a breath sample delivered by the subject, in particular a breath sample exhaled by the subject.

In the following, the term "alcohol" is used for a substance to be detected in the blood of the test person, and the term "breath alcohol" is used for a substance which is then contained in a gas sample, in particular breath sample, of the test person if the subject's blood contains alcohol.

DE 39 04 994 A1 describes a detection device 1 for determining the constituent of a component of a gas, in particular the proportion of alcohol in the breathing air. A cylinder 9 surrounds a prechamber, which functions as a measuring chamber, and a displacement chamber. A piston in the cylinder bounds the displacement chamber on one side and is connected to an eccentric via a connecting rod. A motor drive rotates the eccentric, causing the piston to slide back and forth in the cylinder. The piston first performs an intake stroke, in which the displacement is increased and thereby a gas sample is drawn in, and then an exhaust stroke, in which the displacement is reduced again and thereby a gas sample is expelled again.

SUMMARY

It is an object of the invention to provide an analyzer and an analyzing process for analyzing a gas for a predetermined substance, wherein the analyzer and the analyzing process are intended to be more reliable than known analyzers and analyzing processes.

The object is accomplished by an analyzer (analyzing device) having features according to the invention and by an analyzing process having features according to the invention. Advantageous embodiments of the analyzer according to the invention are, as far as useful, also advantageous embodiments of the analyzing process according to the invention and vice versa.

The analyzer (analyzing device) according to the invention and the analyzing process according to the invention are capable of analyzing a gas for at least one predetermined substance.

The analyzer according to the invention comprises a measuring chamber with an inflow side and an outflow side. This measuring chamber is at least temporarily in fluid communication on the inflow side with an environment of the analyzer. Gas, which is to be analyzed for the substance, can flow from the environment through this fluid connection on the inflow side into the measuring chamber. As a result, a gas sample is formed in the measuring chamber.

Furthermore, the analyzer comprises a sensor. The sensor is capable of measuring an indicator of the amount and/or concentration of the substance in a gas sample, this gas sample being located in the measuring chamber.

A suction (aspiration) chamber unit of the analyzer has a variable volume and is in fluid communication (connection) on the chamber's outflow side with the measuring chamber. Gas can flow through this fluid connection on the outflow side from the measuring chamber into the suction chamber unit and vice versa from the suction chamber unit into the measuring chamber. In particular, the suction chamber unit can comprise a bellows and a plate or a piston-cylinder unit.

The step of increasing the volume of the suction chamber unit causes the following: Gas is drawn (sucked) from the environment of the analyzer through the fluid connection on the inflow side into the measuring chamber. The step of decreasing the volume of the suction chamber unit does the following: Gas is expelled out of the measurement chamber and delivered to the environment. The gas expelled from the measuring chamber is preferably conveyed to the environment through the fluid connection on the inflow side, alternatively through a separate fluid connection.

An actuating unit of the analyzer can be moved relative to the measuring chamber in a first direction and in a second direction, preferably linearly moved. The second direction is opposite to the first direction. The actuating unit is mechanically connected to the suction chamber unit. The step of moving the actuating unit in the first direction causes the following: The volume of the suction chamber unit is increased. The step of moving the actuating unit in the second direction has the following effect: The volume of the suction chamber unit is reduced.

A cam, particularly a cam disk of the analyzer, can be rotated about an axis. A motor of the analyzer is able to rotate the cam disk around this axis.

The actuating unit is mechanically coupled to the cam disk in the manner of a cam follower. The actuating unit is at least temporarily, preferably permanently, in mechanical contact with the cam disk, whereby this contact can be released.

This mechanical coupling accomplishes the following: Each rotational position of the rotatable cam disk relative to the axis determines a respective position of the actuating unit, at least when the actuating unit contacts the cam disk. This position of the actuating unit in turn determines a volume of the suction chamber unit.

The analyzing process according to the invention is carried out using such an analyzer and comprises the following steps:

At least temporarily, the measuring chamber is connected to an environment of the analyzer through the fluid connection on the inflow side. The gas to be analyzed originates from this environment.

At least temporarily, the motor rotates the cam disk around the axis.

The mechanical coupling between the cam disk and the actuating unit means that each rotational position of the cam disk relative to the axis determines a position of the actuating unit and thus a volume of the suction chamber unit.

The actuating unit is moved in the first direction. This step increases the volume of the suction chamber unit. Gas is drawn (sucked) into the suction chamber unit.

This enlargement causes gas from the environment to be drawn into the measuring chamber through the fluid connection on the inflow side. This causes a gas sample to enter the measuring chamber.

The sensor measures an indicator of the amount and/or concentration of the substance in the gas sample in the measuring chamber.

The actuating unit is moved in the second direction. This step reduces the volume of the suction chamber unit. Gas is expelled out of the suction chamber unit.

This reduction causes gas to be expelled from the measuring chamber. This flushes the measuring chamber.

The steps of the analyzing process according to the invention are not necessarily carried out in the (listed) order of this description.

According to the invention, a gas sample is conveyed into the measuring chamber by increasing the volume of the suction chamber unit. By increasing the volume of the suction chamber unit, gas is sucked out of the measuring chamber through the fluid connection on the outflow side into the suction chamber unit. By the configuration of the analyzer, it is known by what value the volume of the suction chamber unit is increased. As a result, it is also known, at least approximately, what the volume of the gas sample being delivered from the environment into the measurement chamber is. This feature increases the reliability with which the sensor measures the amount and/or concentration of the substance, compared to an embodiment in which gas from the environment enters the measurement chamber essentially by diffusion. Suction also fills the measurement chamber with a gas sample more quickly than diffusion.

According to the invention, the measuring chamber is purged by reducing the volume of the suction chamber unit. By reducing the volume, gas flows from the suction chamber unit through the fluid connection on the outflow side into the measuring chamber. A separate fluid delivery unit is not required to flush out (purge) the measuring chamber. After purging, the analyzer is ready to analyze a further (new) gas sample, with the further gas sample located in the measuring chamber. There is little risk that the old sample will falsify the analysis of the further sample.

A movable actuating unit is capable of increasing and decreasing the volume of the suction chamber unit. According to the invention, the analyzer comprises a drive, whereby this drive is capable of moving the actuating unit in both directions and thereby increasing and decreasing the volume of the suction chamber unit.

It would be conceivable that the drive is able to move the actuating unit back and forth directly. According to the invention, however, the drive is connected to the actuating unit via the rotatable cam disk. The drive is configured as a motor, wherein the motor is capable of rotating the cam disk about the axis. A "motor" is understood to be a drive that is capable of moving a unit over a distance that is not limited by the configuration and construction—in contrast, for example, to an actuator or a piston-cylinder unit. It is sufficient that the motor is always able to rotate the cam disk in one direction, preferably in a start-stop operation.

A drive that is capable of rotating a unit—here: the cam disk—with a sufficiently large torque can often be realized with a relatively small installation space—compared to an actuator which oscillates. In many cases, a drive capable of directly moving the actuating unit back and forth would require a larger installation space and/or more electrical energy.

According to the invention, the actuating unit is mechanically coupled to the rotatable cam disk. The actuating unit acts as a cam follower. Each rotational position of the cam disk determines a respective position of the actuating unit and thus a respective volume of the suction chamber unit—at least when the actuating unit contacts the cam disk. The time course of the process of rotating the cam disk, as well as the geometry of the cam disk, therefore determine the time course of the varying volume of the suction chamber unit. The variation of the volume of the suction chamber unit over time determines the process of and how much and how fast gas is sucked into and expelled out of the measuring chamber. Therefore, the invention makes it easier to implement a predetermined process for filling and purging the measuring chamber. In particular, it is easier to cause the amount and/or volume of a gas sample actually in the measuring chamber to be—within a tolerance—equal to a predetermined amount or volume.

According to the invention, a mechanical contact is established between the actuating unit and the cam disk. The actuating unit acts as a cam follower and slides over the surface of the cam disk when the cam disk is rotated. Generally, this mechanical contact can be released, and this can be done by spatially removing the actuating unit from the cam disk. This embodiment makes it easier to assemble, clean, and repair the analyzer compared to, for example, an embodiment in which the actuating unit is implemented using an eccentric and a piston-cylinder assembly.

Preferably, a first rotational position of the cam disk defines a maximum volume of the suction chamber unit. A second rotational position defines a minimum volume. The minimum volume is smaller than the maximum volume. The two rotational positions differ from each other.

Preferably, a mechanical or pneumatic spring of the analyzer is configured tending to press the actuating unit against the cam disk. This spring can be configured in particular as a compression spring or a tension spring. Thanks to the spring, the mechanical coupling between the cam disk and the actuating unit is established. At the very least, however, the spring contributes to this mechanical coupling.

During operation, the event can occur that the actuating unit loses contact with the cam disk, for example due to shocks or vibrations or rapid acceleration of the analyzer. In this case, too, the spring usually quickly restores the mechanical contact.

In one embodiment, the cam disk, the actuating unit, and the measuring chamber are arranged in a line. Preferably, the actuating unit extends along this line. The embodiment that these three components lie in one line saves in many cases space and leads in particular to a relatively small dimension of the analyzer in a direction perpendicular to this line.

According to the invention, the motor is able to rotate the cam disk around the axis. Various configurations of the cam disk are possible.

In one embodiment, the cam disk has a circumferential contour. This circumferential contour deviates from a circular shape. More specifically, the distance between the circumferential contour and the axis about which the cam disk is rotatable varies along the circumferential contour.

Both the first direction and the second direction in which the actuating unit is movable relative to the measuring chamber are perpendicular to the axis about which the cam disk is rotatable. The actuating unit contacts this circumferential contour, and the actuating unit is moved at least temporarily when the cam disk with the varying circumferential contour is rotated. The embodiment with the varying circumferential contour allows the motor to be located laterally of the movable actuating unit. The cam disk may have a relatively small dimension in the two directions in which the actuating unit is movable.

This embodiment can be combined with the embodiment in which a spring is configured to press the actuating unit against the cam disk. In this combination, the spring tends to move the actuating unit against the circumferential contour of the cam disk, i.e. in a direction perpendicular to the axis of the cam disk.

In an alternative embodiment, the cam disk has a surface contour. This surface contour extends in a plane, this plane being perpendicular to the axis about which the cam disk is rotatable. The surface contour of the cam disk deviates from a planar shape. More specifically, the distance between the surface contour and the plane varies across the surface contour. The two directions in which the actuating unit is movable relative to the measuring chamber are parallel to the axis about which the cam disk is rotatable and are perpendicular to the plane just mentioned. In many cases, the configuration with the varying surface contour results in the cam disk having a smaller extension in a direction parallel to the axis.

This embodiment can also be combined with the embodiment comprising a spring. In this combination, the spring is configured to move the actuating unit against the variable surface contour, i.e. parallel to the axis of the cam disk.

According to the invention, one full rotation (revolution) of the cam disk about the axis causes the actuating unit to move at least once in the first direction and then at least once in the second direction. During the movement or each movement in the first direction, the volume of the suction chamber unit is increased. In one embodiment, the cam disk is configured such that for one full rotation of the cam disk about the axis, the actuating unit is moved twice in succession in the first direction. Between these two movements in the first direction, the actuating unit is moved in the second direction. As a result, the volume of the suction chamber unit is first increased, then decreased, and then increased again.

The embodiment in which during one full rotation the actuating unit is moved twice in succession in the first direction allows the analyzer to suck in a respective gas sample twice in succession during a single rotation of the cam disk. In particular, the geometry of the cam disk determines the volume of the gas sample sucked in the first time and the volume of the gas sample sucked in the second time. In particular, the two gas samples may have different volumes, and the two operations of sucking in these two gas samples may take different times. In between, the measuring chamber is purged.

One possible application of the embodiment in which the volume of the suction chamber unit is first increased, then decreased, and then increased again is as follows: Breath air from a subject is to be tested for alcohol. First, breathing air from the subject's mouth is to be examined to determine if the subject has recently drunk alcohol. Next, breathing air from the subject's lungs is to be examined to determine if the subject's blood contains alcohol. Breathing air from the subject's upper respiratory tract, on the other hand, should not be examined and should therefore ideally not enter the measuring chamber.

According to the invention, gas can flow through the fluid connection on the inflow side into the measuring chamber. In one embodiment, a valve of the analyzer can be moved back and forth between a closing end position and a releasing end position. In the closing end position, the valve closes the fluid connection on the inflow side. In the releasing end position, the valve releases the fluid connection on the inflow side. Preferably, the valve also releases the inflow-side fluid connection in each intermediate position, but with a smaller cross-sectional area available for gas to flow compared to the releasing end position. In the closing end position as well as in each intermediate position, on the one hand the danger is reduced or even eliminated that harmful gases or particles in the environment enter the measuring chamber and thus reach the sensor. On the other hand, the danger is reduced or even excluded that a component of the sensor evaporates. In each intermediate position as well as in the releasing end position, gas can flow into the measuring chamber, and pressure equalization between the environment and the measuring chamber can take place. Preferably, the valve comprises a valve body and a valve body seat, the valve body being movable relative to the valve body seat.

Gas can only flow from the environment into the measuring chamber when the valve is in the releasing end position or in an intermediate position. It is possible that the valve comprises its own drive, which is capable of moving the valve back and forth between the two end positions.

In a preferred embodiment, however, the valve, or at least the valve body, is mechanically connected to the actuating unit. This enables the motor to rotate the cam disk not only to change the volume of the suction chamber unit, but also to move the valve from one end position to the other end position. This configuration saves a separate drive for the valve.

Preferably, the suction chamber unit and the valve are coupled together by means of the actuating unit as follows:

In a first alternative, the operation of moving the actuating unit in the first direction causes the valve to move towards the closing end position. The action of moving the actuating unit in the second direction causes the valve to move towards the releasing end position.

In a second alternative, the operation of moving the actuating unit in the first direction causes the valve to move towards the releasing end position. The action of moving the actuating unit in the second direction causes the valve to move towards the closing end position.

This synchronization often enables, with a particularly high degree of reliability, the fluid connection on the inflow side to be open only as long as necessary and closed or at least largely closed for as long as possible. In addition, the time course of the movement of the valve is synchronized with the time course of the volume of the suction chamber unit.

In one embodiment, the actuating unit comprises a rigid rod and a contact element. The contact element is in contact with the cam disk. In one embodiment, the spring described above is configured to press the contact element against the cam disk. The rod mechanically connects the contact element to the valve. In many cases, this embodiment leads to a particularly space-saving and robust design of the analyzer.

In one embodiment, the motor rotates the cam disk so that the cam disk completes at least one full rotation (revolution) about the axis without an interruption.

In one embodiment, the rotation of the cam disk is controlled by open-loop control, for example in such a way that the rotational speed increases to a maximum value in a start-up phase according to a predetermined speed profile of the cam disk, then remains constant at this maximum value and is reduced again in a final phase, in particular to zero. In this embodiment, the position of the actuating unit depends on the time elapsed so far since the start of rotation.

In a preferred embodiment, however, the rotation of the cam disk is controlled by closed-loop control. A position sensor of the analyzer is capable of automatically measuring an indicator of the current rotational position about the axis of the cam disk relative to a reference rotational position. Particularly preferably, the motor can be controlled and thereby activated (turned on) and deactivated (turned off). A signal-processing control unit of the analyzer is capable of driving the motor and thereby activating and deactivating it. This control unit can receive a signal from the position sensor. Depending on this signal from the position sensor, the control unit can activate and deactivate the motor.

This embodiment allows the volume of the suction chamber unit to be changed in response to external events, such as a volume flow into or out of the measuring chamber and/or a signal from the sensor in or at the measuring chamber. The event may also consist of a mouthpiece being placed on the analyzer and the analyzer now being ready to receive a breath sample.

In one embodiment, the position sensor comprises a perforated disk and a photoelectric sensor. The perforated disk can rotate about the same axis as the cam disk and is non-rotatably (torsion-proof) connected to the cam disk. The perforated disk interrupts a light beam of the photoelectric sensor. At least one recess in the perforated disk releases this light beam. Outside the recess or each recess, the perforated disk interrupts the light beam.

In one embodiment, the analyzer is used to analyze a gas sample emitted by a subject for a predetermined substance. In particular, the analyzer is capable of analyzing a gas sample exhaled by the subject. In particular, the substance is breath alcohol. In this embodiment, the analyzer preferably comprises an input unit, in particular a mouthpiece. The subject delivers the breath sample into the input unit, and the measuring chamber is in fluid communication with the input unit via the fluid connection on the inflow side.

In one embodiment, the analyzer is configured as a portable device and includes its own power supply unit. This allows the analyzer to be used, for example, to check vehicle drivers at a checkpoint. It is not necessary that a power supply network is available at this checkpoint. In many cases, the invention results in a relatively low consumption of electrical energy, which is particularly important if the analyzer has its own power supply unit. In another embodiment, the analyzer is connected or can be connected to a stationary voltage supply network.

In the following, the invention is described by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
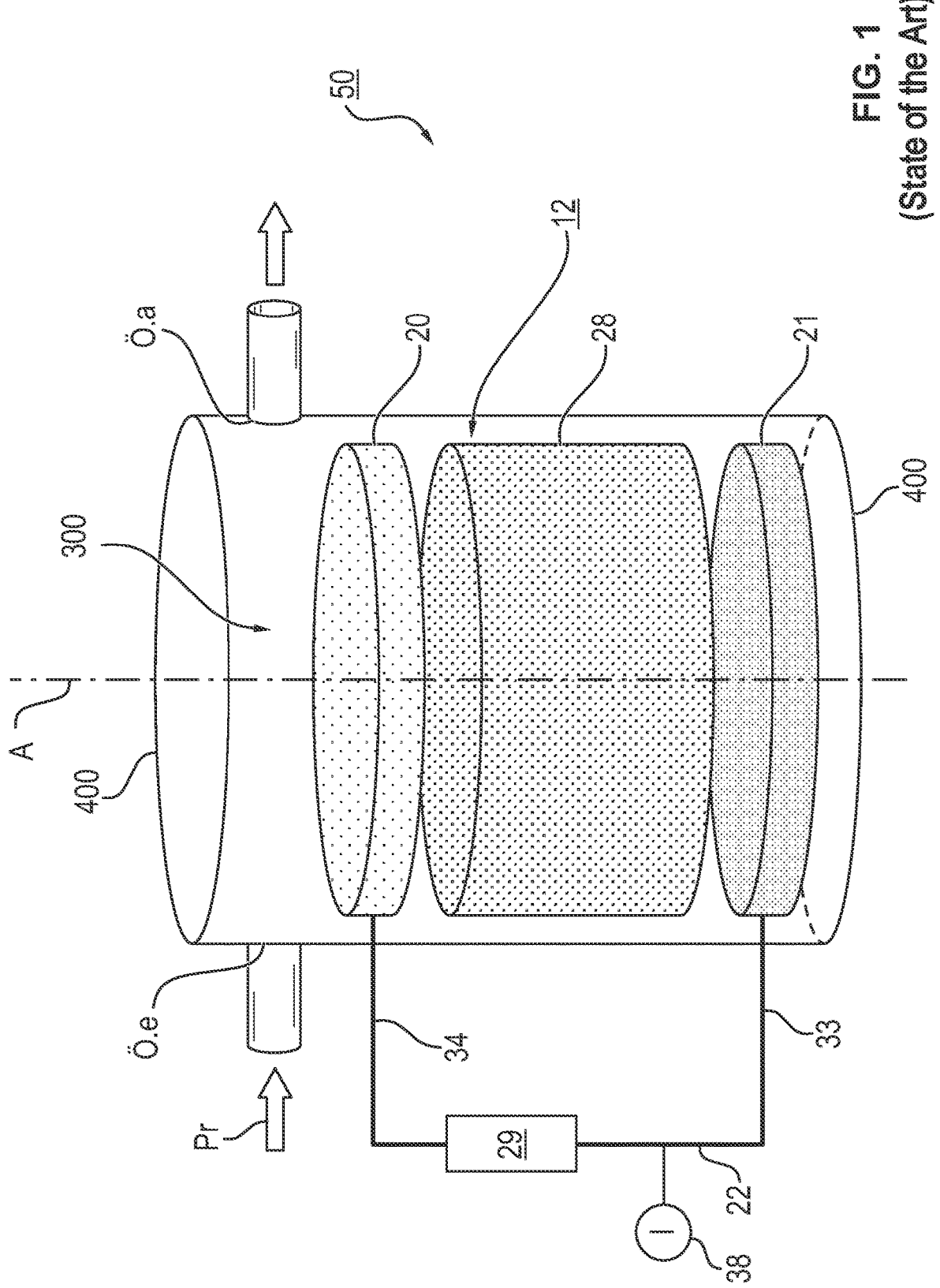
FIG. 1 is a schematic view showing the mode of operation of an electrochemical sensor.

Referring to the drawings, in the embodiment example, the analyzer according to the invention is used to analyze a breath sample exhaled by a subject for a predetermined substance, in particular breath alcohol. In the case of breath alcohol as the substance, a subject is to be analyzed to determine whether or not alcohol is present in the subject's blood above a detection limit. The subject enters a breath sample into a mouthpiece of the analyzer. If the subject has consumed alcohol and the alcohol in the blood has not yet completely decomposed, the breath sample delivered contains breath alcohol. A portion of the delivered breath sample flows into a measuring chamber inside the analyzer. This portion acts as a gas sample to be analyzed and is referred to below as the "measuring chamber sample." A sensor in or on the measuring chamber checks whether or not this measuring chamber sample contains breath alcohol or any other predetermined substance. Optionally, it is additionally to be checked whether the air in the mouth of the subject contains breath alcohol. The invention can also be applied to another substance that may be present in the exhaled air of a subject or in any other gas that a subject may emit.

The sensor is capable of generating a signal that correlates with the amount and/or concentration of the given substance in the measuring chamber sample that is in the measuring chamber. Various suitable sensors are known from the prior art, for example electrochemical sensors, photo-optical sensors, photo-acoustic sensors, photo-ionization sensors, and heat tone sensors (catalytic sensors). Such a sensor can also be applied to the invention.

The analyzer derives the concentration of breath alcohol in the input breath sample from the amount and/or concentration of breath alcohol in the measuring chamber sample and the amount and/or volume of the measuring chamber sample. For example, the amount and/or volume of the measuring chamber sample is derived as follows:

depending on the volume of the measuring chamber and/or depending on the volume and/or volume change of the suction chamber unit described below and/or by measuring the volume flow into the measuring chamber several times and integrating the measured values.

The volume of the measuring chamber and the minimum and maximum volumes of the suction chamber unit are known by the design of the analyzer.

If the substance is breath alcohol, a signal-processing evaluation unit of the analyzer or a spatially remote evaluation unit derives the current content of alcohol in the subject's blood from the breath alcohol concentration in the breath sample.

While the breath sample flows through the mouthpiece, exhaled air first flows out of the mouth, then exhaled air from the upper respiratory tract, and finally exhaled air from the subject's lungs flows through the mouthpiece. The term "upper airways" refers to the connection between the subject's mouth and lungs. To determine if the subject has just consumed alcohol, the gas from that portion of the breath sample that originates from the subject's mouth, optionally from the upper respiratory tract, shall be examined. To determine if the subject's blood contains alcohol, gas from that portion of the breath sample that originates from the lungs shall be examined. If the sole purpose is to investigate whether the subject's blood contains alcohol, ideally only gas from the subject's lungs will flow into the measuring chamber, and the measuring chamber sample will contain only air from the lungs, but no air from the upper respiratory tract and no air from the mouth. If it is additionally to be investigated whether the subject has just drunk alcohol, additional gas from the subject's mouth is to be investigated and must also enter the measuring chamber. In one embodiment, the air from the upper airways of the subject is also examined. In another embodiment, air from the upper airways is largely prevented from entering the measuring chamber.

The analyzer of the embodiment comprises an electrochemical sensor, such as the electrochemical sensor 12 as shown in FIG. 1. By a "sensor" is meant a component that automatically generates a signal, wherein the generated signal is a measure (indicator) of the amount and/or concentration of a given substance in the measuring chamber sample, wherein said measuring chamber sample is located in a measuring chamber, and wherein the sensor is capable of analyzing said measuring chamber sample in the measuring chamber. An electrochemical sensor triggers a chemical reaction, wherein the chemical reaction depends on the amount and/or concentration of the substance to be analyzed and affects a measurable electrical detection quantity, for example the current (amperage) or the electrical voltage or the electrical charge or the electrical resistance of a component of the sensor.

FIG. 1 shows schematically and by way of example the mode of operation of an electrochemical sensor 12 as known from the prior art. Such a sensor 12 can also be a component of the analyzer (the analyzing device) according to the invention. The representation of FIG. 1 is not necessarily to scale. This electrochemical sensor 12 is capable of analyzing a measuring chamber sample Pr for breath alcohol and operates according to the principle of a fuel cell with alcohol as the fuel. In one embodiment, the analyzer according to the invention comprises such an electrochemical sensor 12.

In FIG. 1, the reference number 50 designates a sensor arrangement comprising the actual electrochemical sensor 12 and a wall 400 for a measuring chamber 300. The wall 400 surrounds the sensor 12 and the measuring chamber 300. In the form of realization shown, both the wall 400 and the sensor 12 are rotationally symmetrical about a central axis A, which lies in the drawing plane. Of course, other geometric shapes are also possible.

The measuring chamber sample Pr to be analyzed, which originates from a breath sample A, flows through an opening Ö.e on the inflow side into the interior of the measuring chamber 300, e.g. by being sucked in and/or diffusing into the measuring chamber 300. The measuring chamber sample Pr may flow back out of the measuring chamber 300 through an outlet-side opening Ö.a. With such a configuration, the sensor 12 can quickly examine several measuring chamber samples Pr in succession. There may instead be no outlet-side opening Ö.a and the measuring chamber sample Pr may flow out of the measuring chamber 300 through the inflow-side opening Ö.e again.

The electrochemical sensor 12 comprises a measuring electrode 20, which is electrically contacted by a contacting wire 34, a counter electrode 21, which is electrically contacted by a contacting wire 33, an electrolyte 28 between the two electrodes 20 and 21, a connecting wire 22 electrically connecting the two contacting wires 33 and 34 and comprising an electrical measuring resistor 29, and a current (amperage) sensor 38 that measures the intensity I of the current flowing through the connection wire 22.

The electrolyte 28 is preferably provided by a membrane. Such an electrochemical sensor 12 is also referred to below as a membrane electrode electrolyte unit (MPEE).

The electrolyte 28 is an electrically conductive medium, for example sulfuric acid or phosphoric acid or perchloric acid diluted with water. Ions can move in the electrolyte 28 as electrical charge carriers, which causes electrical conductivity. Preferably, a porous membrane provides the electrolyte 28. The electrolyte 28 provides an ionically conductive connection between the measuring electrode 20 and the counter electrode 21.

The sensor 12 is configured such that the measuring chamber sample Pr reaches only the measurement electrode 20, but not the counter electrode 21. In the example shown, the measurement electrode 20 is located on a wall 400 of the measuring chamber 300, and the wall 400 and the electrolyte 28 prevent a relevant amount of the measuring chamber sample Pr from reaching the counter electrode 21.

The two contact wires 33 and 34 are electrically conductive and made of a material that is not chemically attacked by the electrolyte 28, for example platinum or gold. The electrodes 20 and 21 are also made of a chemically resistant material, for example also platinum or gold. In many cases, the chemically resistant material of the electrodes 20, 21 additionally acts as a catalyst for a chemical reaction caused and used for measurement.

The electrochemical sensor 12 may operate on the principle of a fuel cell. The chemical reaction used for measurement includes the step of oxidizing breath alcohol in the measuring chamber sample Pr in the measuring chamber
300. Ideally, the entire amount of breath alcohol in the
measuring chamber sample Pr is oxidized.

As a result of the chemical reaction, electric current flows
between the measuring electrode 20 and the counter elec-
trode 21 and thus through the connecting wire 22. The
current (amperage) sensor 38 measures an indicator of the
electric charge, i.e. the total amount of electric current
flowing through the connecting wire 22 (principle of cou-
lometry). Generally, electric current flows until all electro-
chemically oxidizable gas, in this case breath alcohol, is
actually electrochemically converted in the measuring
chamber 300. For a given volume of the measuring chamber
sample Pr in the measuring chamber 300, the more breath
alcohol the measuring chamber sample Pr contains before
electrochemical conversion, the higher the measured electric
charge Q. The measured electric charge Q is therefore a
measure (indicator) of the breath alcohol content in the
measuring chamber sample Pr and thus of the alcohol
content in the blood of the test person.

Figure 2:
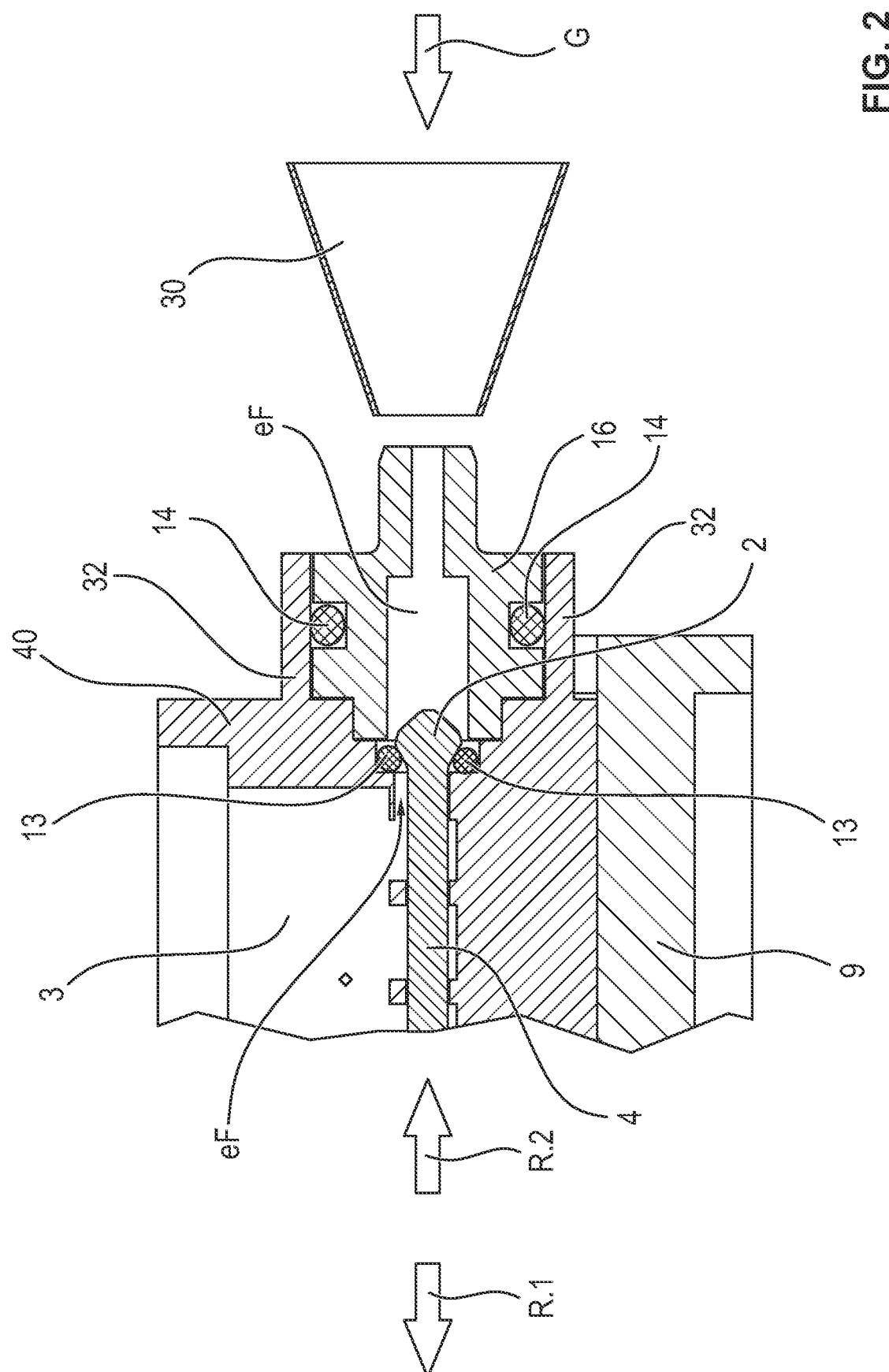
FIG. 2 is a sectional view showing a sample inlet of an analyzer according to the invention.
Figure 7:
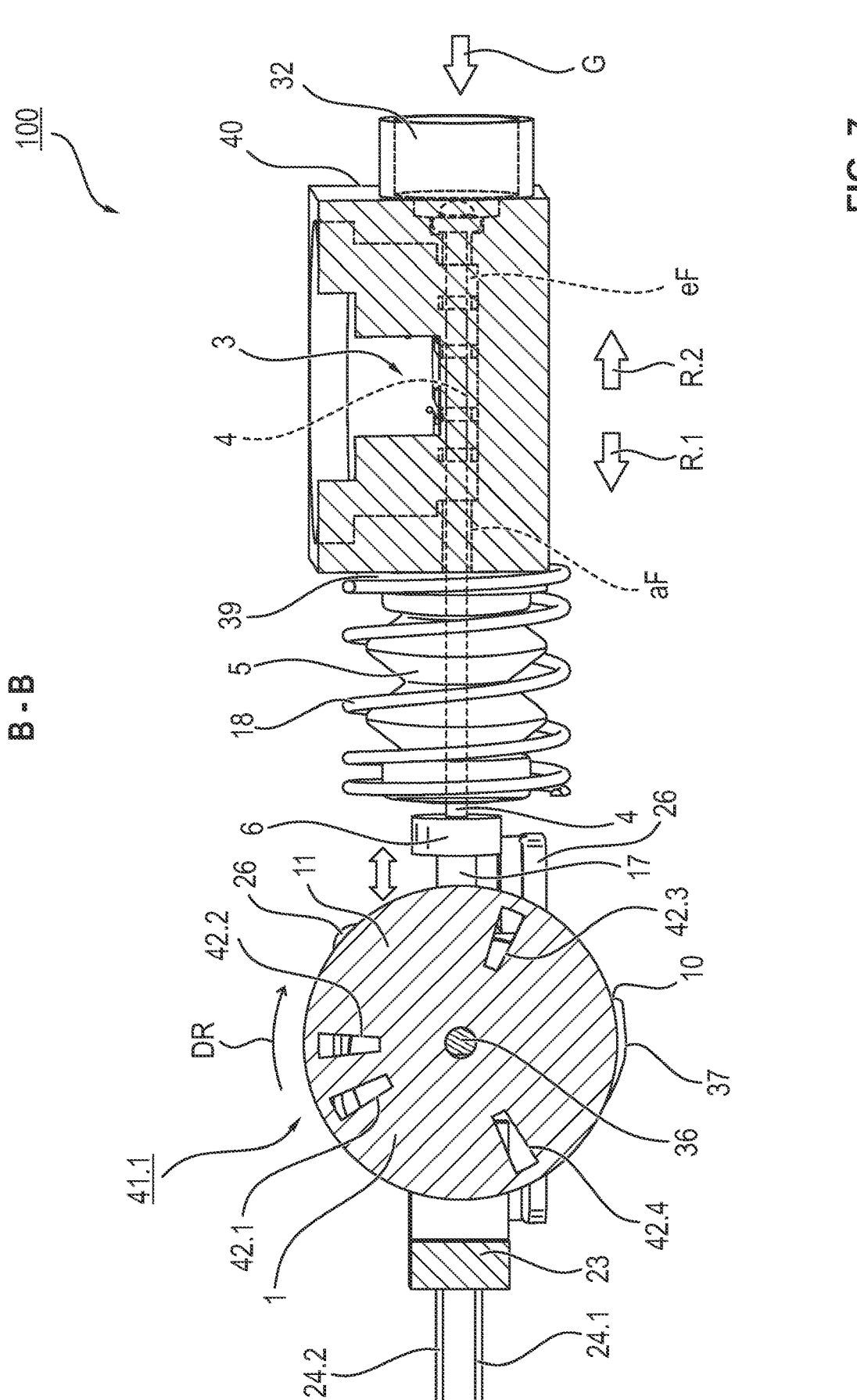
FIG. 7 is a vertical sectional view through the analyzer in the plane B-B of FIG. 5.
Figure 8:
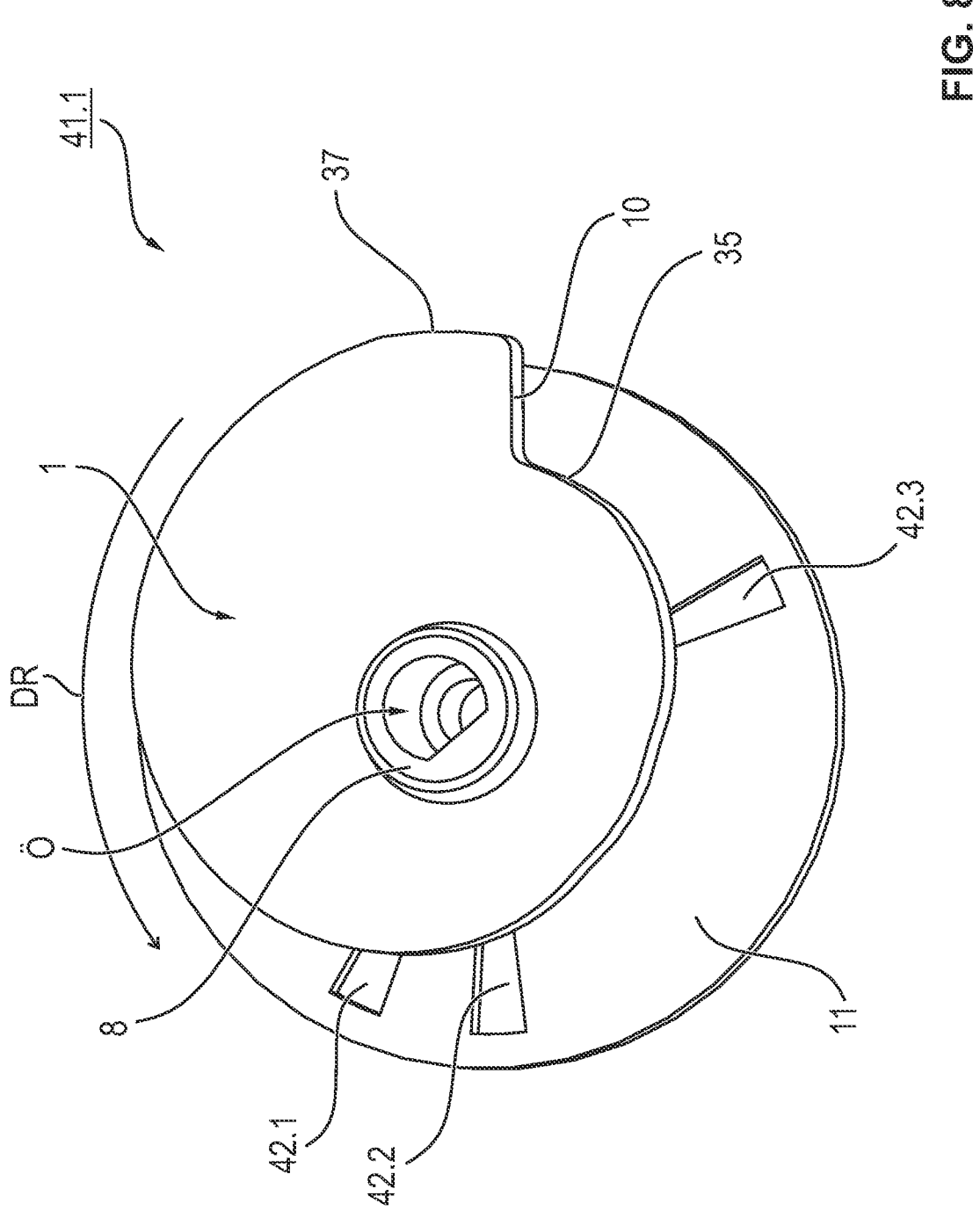
FIG. 8 is a detailed perspective representation showing the conversion component of the first embodiment.
Figure 9:
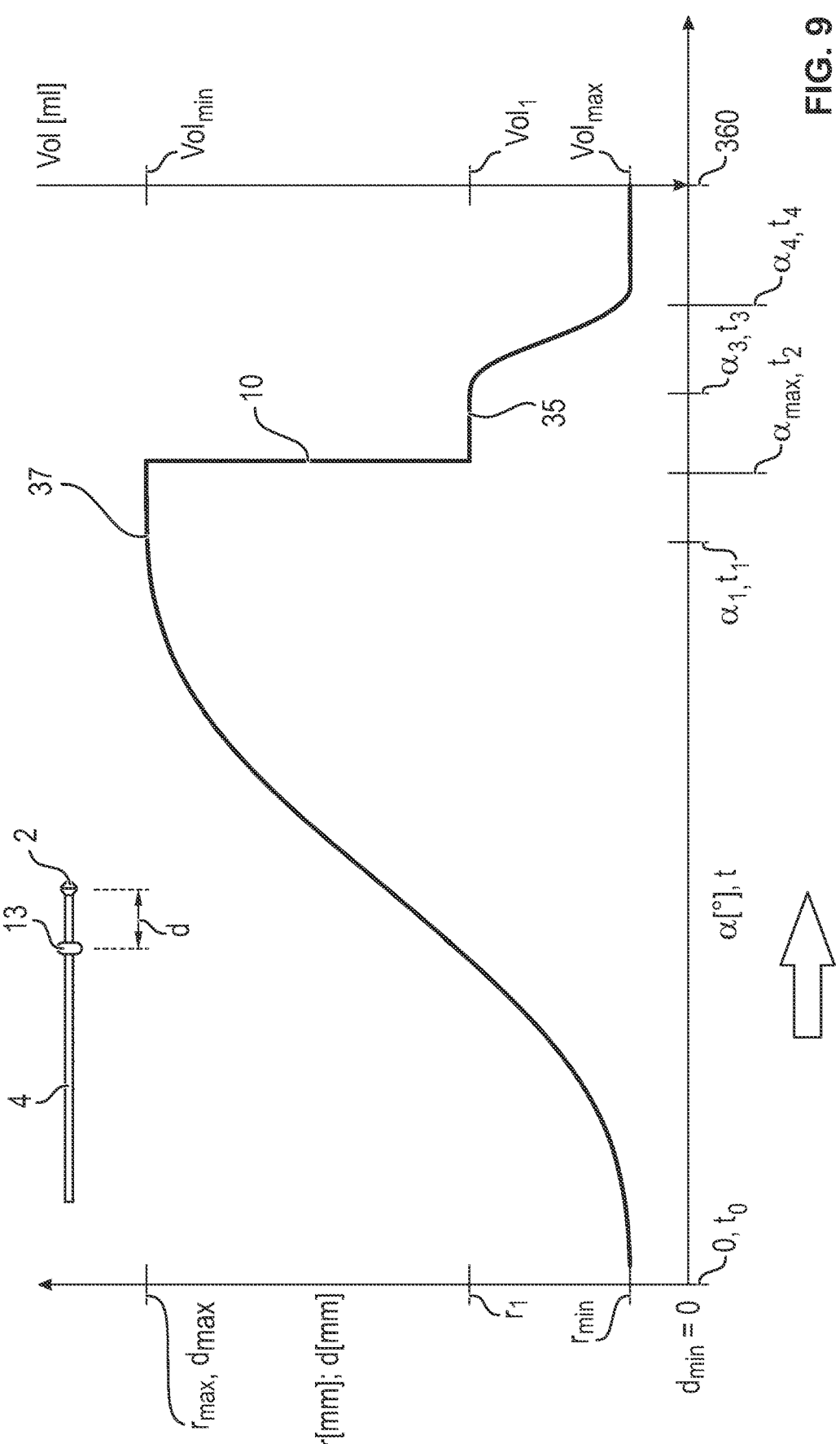
FIG. 9 is a graph showing the dependence between the opening width of the valve and the rotational position of the cam disk.

FIG. 3 to FIG. 8 show a first embodiment of the analyzer
100 according to the invention. FIG. 10 to FIG. 15 show a
second embodiment. Each embodiment includes a housing
wall 40 with a measuring chamber 3 that may have electro-
chemical sensor features such as the electrochemical sensor
12 described above with reference to FIG. 1. FIG. 2 and FIG.
9 are valid for both embodiments.

FIG. 2 shows a schematic cross-sectional view of a
sample inlet 16 and a fluid connection to the measuring
chamber 3. A funnel-shaped mouthpiece 30 can be placed on
the sample inlet 16 and removed again. In one embodiment,
a contact switch not shown detects the event that the
mouthpiece 30 is placed on the sample inlet 16. The wall 40
surrounds the measuring chamber 3 and the sensor 12. The
sample inlet 16 is connected to the wall 40 and is surrounded
by an inlet-side connection piece 32, which is connected to
the wall 40 in a fixed or also detachable manner. A sealing
ring 14 secures the sample inlet 16 in the inlet-side connec-
tion piece 32.

A valve with a movable valve body 2 and a valve body
seat in the form of a sealing ring 13 is capable of optionally
releasing or closing the fluid connection between the mouth-
piece 30 and the measuring chamber 3. This fluid connection
is hereinafter referred to as the inflow-side fluid connection
eF. The valve body 2 can be moved back and forth relative
to the valve body seat 13 between a fully closing and a fully
opening end position. In FIG. 2, the valve body 2 is in
fluid-tight contact with the sealing ring 13 and completely
closes the fluid connection through the sample inlet 16, i.e.
the inflow-side fluid connection eF. By moving the valve
body 2 away from the sealing ring 13, to the right in FIG. 2,
the valve 2, 13 releases the inflow-side fluid connection eF
and gas G can flow from the mouthpiece 30 through the
inflow-side fluid connection eF into the measuring chamber
3.

The valve body 2 is fixedly mounted on an end of a rod
4 pointing towards the sample inlet 16, in FIG. 2 on the right
end. The rod 4 belongs to the actuating unit of the embodi-
ment, extends along a longitudinal axis LA and is able to
move linearly relative to the wall 40 and relative to the
sealing ring 13 in two opposite directions R.1 and R.2. These
two directions R.1, R.2 are shown horizontally in FIG. 2 and
lie in the drawing plane. Preferably, the rod 4 is guided in
such a way that it can move exclusively in these two
directions R.1 and R.2. A movement of the rod 4 in the first
direction R.1 reduces the distance between the valve body 2
and the sealing ring 13, a movement in the second direction R.2 increases this distance. The two directions R.1 and R.2
are indicated by two arrows in FIG. 2. The movement of the
rod 4 causes the valve 2, 13 to selectively block or unblock
the inflow-side fluid connection eF. In FIG. 2, the valve 2,
13 is shown in a closing end position.

In the realization form shown in FIG. 2, the valve body
seat 13 is located downstream of the valve body 2. The valve
2, 13 is opened by moving the valve body 2 in the second
direction R.2 away from the sealing ring 13 and towards the
mouthpiece 30. The opposite realization is also possible, in
which the valve body seat 13 is located upstream of the
valve body 2 and the valve 2, 13 is opened by moving the
valve body 2 in the first direction R.1 away from the
mouthpiece 30.

Figure 3:
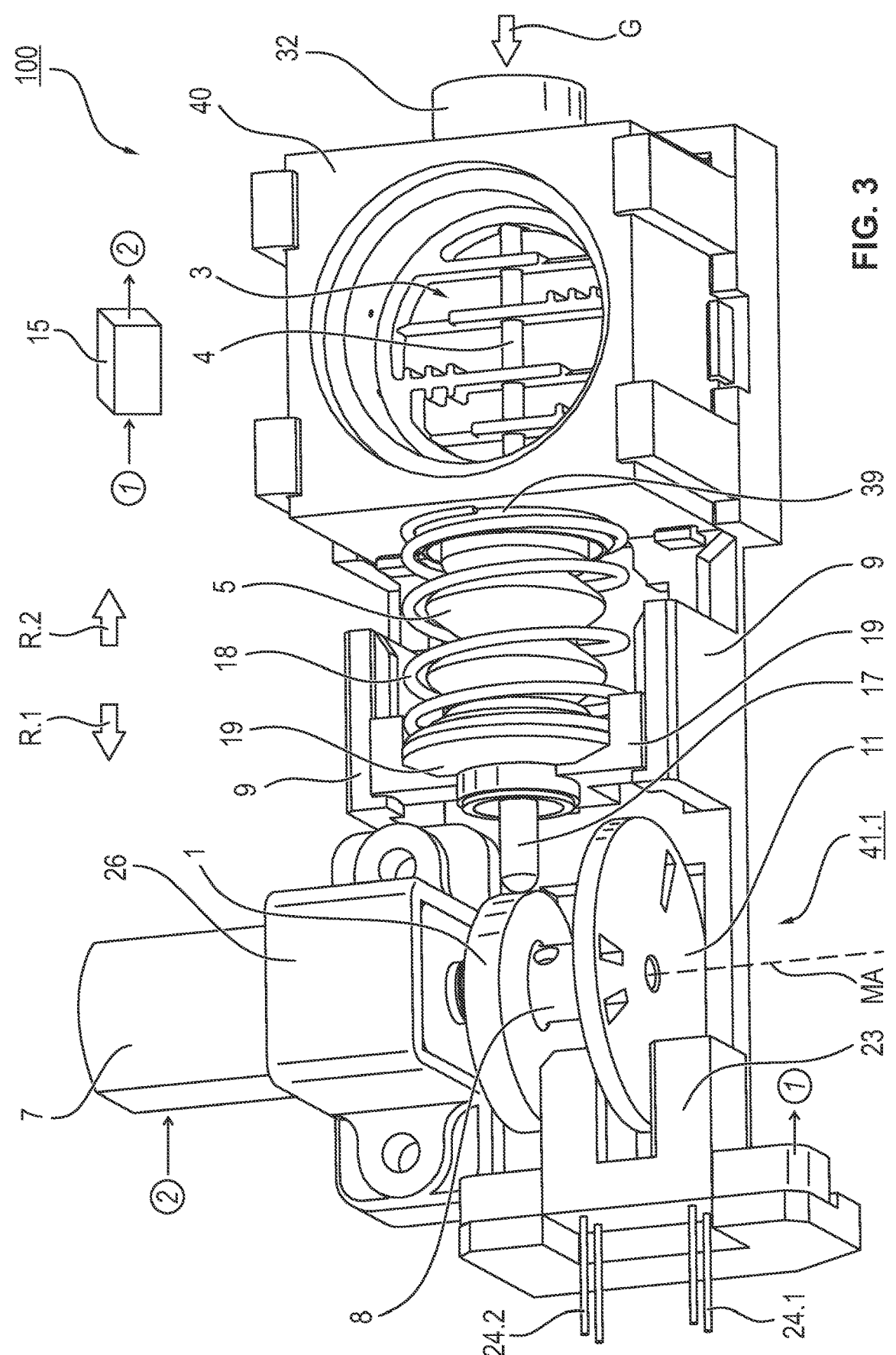
FIG. 3 is a perspective view obliquely from above showing an analyzer according to the invention according to a first embodiment.

FIG. 3 shows in a perspective view obliquely from above
an analyzer 100 according to the invention according to the
first embodiment. A gas sample G can flow through the
mouthpiece 30, the sample inlet 16 and the connection piece
32 on the inflow side into the measuring chamber 3, namely
horizontally from right to left in FIG. 3. The connection
piece 32 on the inflow side and a connection piece 39 on the
outflow side are attached to the cuboid wall 40 of the
measuring chamber 3. A sensor is arranged in the measuring
chamber 3, which can be constructed as shown in FIG. 1 and
is omitted in FIG. 3.

On the one hand, the measuring chamber 3 is connected
to the mouthpiece 30 and thus to the environment by means
of the fluid connection eF on the inflow side. This fluid
connection eF on the inflow side leads through the sample
inlet 16 and the connection piece 32 on the inflow side. On
the other hand, the measuring chamber 3 is in fluid connec-
tion aF with a bellows 5 on the outflow side. This fluid
connection aF on the outflow side leads through the con-
nection piece 39 on the outflow side, see FIG. 6 and FIG. 7.

The bellows 5 belongs to the suction chamber unit of the
embodiment. The bellows 5 according to the embodiment
has a wall made of a flexible material and can be selectively
transferred to a state with minimum volume and to a state
with maximum volume. In FIG. 3, the bellows 5 is shown in
an intermediate state between the two end positions. The
step of enlarging the bellows 5, in particular transferring it
to the state with maximum volume, causes gas to be drawn
from the measuring chamber 3 through the fluid connection
aF on the outflow side into the interior of the bellows 5. As
a result, gas G is drawn into the measuring chamber 3
through the fluid connection eF on the inflow side. In this
way, part of the breath sample that the test person (subject)
has delivered also enters the measuring chamber 3. The step
of reducing the size of the bellows 5, in particular transfer-
ring it to the state with minimum volume, causes gas to be
conveyed from the bellows 5 through the fluid connection aF
on the outflow side into the measuring chamber 3. As a
result, the measuring chamber 3 is purged and gas flows out
of the measuring chamber 3 through the fluid connection eF
on the inflow side back into the mouthpiece 30 and thus into
the environment.

Figure 4:
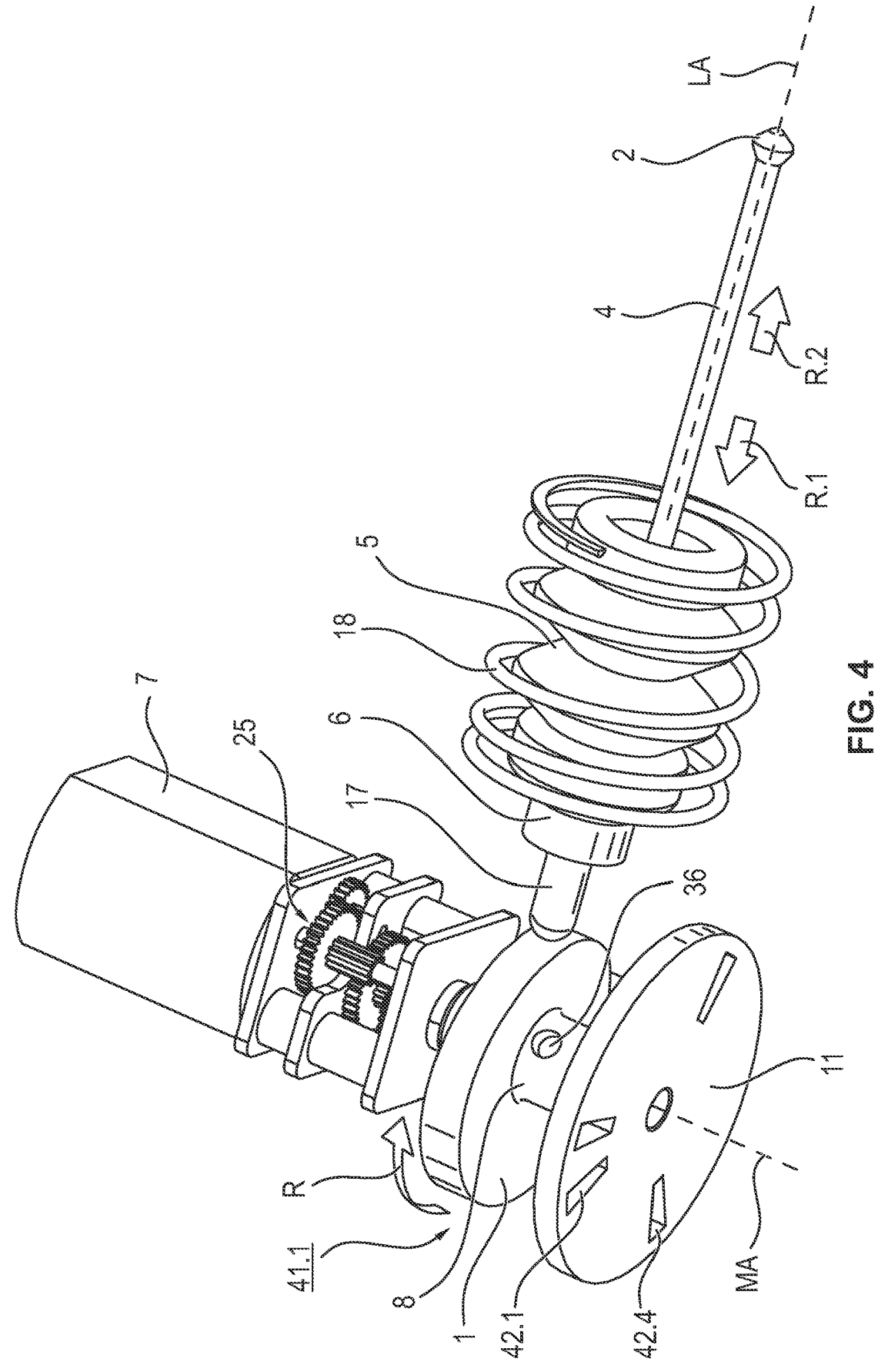
FIG. 4 is a perspective view diagonally from above showing the drive and the driven parts of the analyzer of FIG. 3.

FIG. 4 shows in a perspective view obliquely from above
the drive and the driven parts of the analyzer 100 of FIG. 3.
A plate 6 is fixedly mounted on the rod 4 in such a way that
the plate 6 is perpendicular to the longitudinal axis LA of the
rod 4 and the rod 4 is guided through the plate 6. This plate
6 transmits a movement of the rod 4 to the bellows 5. If the
rod 4 is moved away from the mouthpiece 30 and the sample
inlet 16, i.e. in the example of FIG. 4 in the first direction R.1
to the left, the plate 6 causes the bellows 5 to be enlarged,
for example to the state with maximum volume. This causes
gas G to be sucked into the bellows 5. This in turn causes gas G to be drawn out of the mouthpiece 30 into the measuring chamber 3. At the end of the movement, the valve body 2 is drawn onto the valve body seat 13. If the rod 4 is moved in the opposite direction R.2, the bellows 5 is reduced in size, for example to the minimum volume state. As a result, gas is conveyed out of the bellows 5. In turn, this causes gas to be conveyed out of the measuring chamber 3, and as a result, the measuring chamber 3 is purged. In addition, the valve 2, 13 is opened.

To draw a gas sample G into the measuring chamber 3, the following sequence is preferably performed:

Initially, the bellows 5 is in the maximum volume state and the valve 2, 13 is closed. As long as the valve 2, 13 is in the closed end position, harmful gases and particles are prevented from reaching the measuring chamber 3 from the outside through the fluid connection eF on the inflow side. In addition, a component of the sensor 12, for example the electrolyte 28, is prevented from evaporating.

The rod 4 is moved in the second direction R.2 and thus towards the sample inlet 16 and the mouthpiece 30. This step is triggered by a first event, which will be referred to below as the "flush-triggering event". As a result of the movement of the rod 4, the bellows 5 is transferred to the minimum volume state, and the measuring chamber 3 is purged. In addition, the valve 2, 13 is opened so that gas can flow out of the measuring chamber 3 and through the fluid connection eF on the inflow side into the mouthpiece 30 and thus into the environment.

The rod 4 is then moved again in the first direction R.1 and thus away from the sample inlet 16 and the mouthpiece 30. This step is triggered by a second event, referred to below as the "suction-triggering event". The movement again moves the bellows 5 away from the minimum volume state, i.e., its volume is increased. As a result, a gas sample is sucked into the measuring chamber 3 through the fluid connection eF on the inflow side. In addition, the valve 2, 13 is moved away from the fully releasing end position, preferably to an intermediate position.

Finally, the initial state is restored, i.e. the rod 4 is moved further in the first direction R.1, and as a result the valve 2, 13 is completely closed and the bellows 5 is transferred to the state with maximum volume.

In the embodiment example, the rod 4 causes the following synchronization of two operations: The operation to increase or decrease the size of the bellows 5 is synchronized with the operation to move the valve body 2 relative to the valve body seat 13. Thanks to the rod 4, the valve 2, 13 is fully closed when the bellows 5 has the maximum volume condition. The valve 2, 13 is fully open when the bellows 5 has the state with minimum volume. Reverse synchronization is also possible, i.e. thanks to the rod 4, the valve 2, 13 is closed when the bellows 5 is in the state with minimum volume.

As just described, the bellows 5 is enlarged, for example transferred to the state with maximum volume, and thereby a gas sample G is sucked into the measuring chamber 3. Subsequently, the bellows 5 is made smaller again, for example transferred to the state with minimum volume. This flushes the measuring chamber 3.

Preferably, the bellows 5 is enlarged by a rapid movement from the minimum volume state, which draws a gas sample G into the measuring chamber 3. "Rapid movement" means: this movement takes at most one second, preferably less than 100 milliseconds. As a result, a defined amount of the gas is sucked into the measuring chamber 3, and only a small amount of gas diffuses into the measuring chamber 3.

It is possible that the bellows 5 is reduced in size again by an equally rapid movement and transferred to the state with minimum volume.

In a preferred embodiment, on the other hand, the bellows 5 is returned to the state with minimum volume by a substantially slower movement, this slower movement preferably lasting at least half a second, particularly preferably at least one second, especially ten seconds. During this movement, the speed with which the rod 4 is moved in the second direction R.2 towards the sample inlet 16 can change.

Preferably, the valve 2, 13 does not completely close the fluid connection eF on the inflow side until a second closing event has occurred. As long as the fluid connection eF on the inflow side is not completely closed, pressure equalization takes place between the pressure in the measuring chamber 3 and the ambient pressure. Note: Due to a pneumatic flow resistance in the fluid connection eF on the inflow side, this pressure equalization often takes some time. In addition, the pressure equalization avoids the undesirable event that the measurement result of the sensor 12 is influenced by how tightly the valve 2, 13 actually closes the fluid connection eF on the inflow side.

In the embodiment example described with reference to the figures, from each subject a respective single gas sample G is fed into the measuring chamber 3. Ideally, this gas sample G consists exclusively of air originating from the subject's lungs, but neither consists of air from the subject's mouth nor consists of air from the subject's upper airways. Defining the opening event makes it relatively easy to determine which part of the breath sample is drawn into the measuring chamber 3.

The flush-triggering event causes the measuring chamber 3 to be flushed. This event has occurred, for example, when the above-mentioned contact switch detects the event that the mouthpiece 30 is placed on the sample inlet 16. Because the measuring chamber 3 is purged and gas flows out of the measuring chamber 3 through the fluid connection eF on the inflow side, gas from the mouthpiece 30 is prevented from flowing into the measuring chamber 3 through the sample inlet 16.

The suction-triggering event triggers the step of moving the rod 4 in the first direction R.1 away from the sample inlet 16, thereby moving the bellows 5 away from the minimum volume state and thereby increasing the volume of the bellows 5. In one embodiment, the suction-triggering event has occurred when a predetermined period of time has elapsed since the operation of placing the mouthpiece 30 on the sample inlet 16. In another embodiment, a volume flow sensor, not shown, measures an indicator of the volume flow into the mouthpiece 30 and derives therefrom the volume of the amount of gas that has flowed into or through the mouthpiece 30 into the measuring chamber 3 up to that point in time. When this volume has reached a predetermined volume threshold, all air from the subject's mouth and upper airways has flowed into the mouthpiece 30, and air from the subject's lungs follows. For example, the volume threshold is predetermined to be equal to the average volume of the upper airway and mouth of an adult subject. The suction-triggering event has occurred when the volume that has flowed into the mouthpiece 30 so far has reached the volume threshold.

In a preferred embodiment, the bellows 5 is moved out of the minimum volume state and enlarged by a rapid movement in the first direction R.1, thereby drawing a gas sample into the measuring chamber 3 without being immediately transferred to the maximum volume state. The rapid movement preferably lasts less than 1 sec, especially preferably less than 100 msec. The valve 2, 13 is transferred from the fully open (releasing) end position to an intermediate position by the rapid movement. By a subsequent slower movement in the first direction R.1, the bellows 5 is transferred to the state with maximum volume. The valve 2, 13 is completely closed. The inflow-side fluid connection eF remains open until the valve 2, 13 is completely closed. Therefore, the pressure equalization between the measuring chamber 3 and the environment described above can take place. Gas is also drawn into the measuring chamber 3 during the subsequent slower movement, but significantly less than during the rapid movement.

Preferably, the valve 2, 13 is then moved to the fully closing end position by a movement in the first direction R.1 when a predetermined closing event has occurred. In one embodiment, the closing event has occurred when the chemical reaction of the sensor 12 is fully completed. In one embodiment, this event is determined by the current (amperage) of the current flowing through the line 22 of the sensor 12 of FIG. 1 falling below a predetermined threshold. This means that the electrochemical sensor 12 has converted all of the breath alcohol in the measuring chamber 3.

A subsequent further slow movement in the second direction R.2 transfers the bellows 5 from the state with maximum volume back to the state with minimum volume. The valve 2, 13 is opened again. The measuring chamber 3 is flushed.

As already explained, the rod 4 can be moved linearly in two opposite directions R.1 and R.2. This is indicated in FIG. 2, FIG. 3 and FIG. 4 by two opposite arrows R.1 and R.2. The movement of the rod 4 transfers both the bellows 5 from one state to the other state and the valve body 2 relative to the valve body seat 13 from one end position to the other end position. A preferred embodiment of how this rod 4 is moved is set forth below.

A contact element in the form of a tappet (plunger) 17 is mounted on that free end of the rod 4 which faces away from the valve 2, 13. The rod 4 is guided through a round opening in a connecting element 19, cf. FIG. 3. The diameter of the tappet 17 is larger than the diameter of this round opening in the connecting element 19. A compression spring 18 is supported on the wall 40 and is configured to move the connecting element 19 and thus the tappet 17 and the rod 4 away from the sample inlet 16 and away from the connection piece 32 on the inflow side, i.e. in the first direction R.1. The tappet 17 and thus the rod 4 can be moved against the spring force of the compression spring 18 towards the inflow-side connection piece 32, i.e. in the second direction R.2. In FIG. 4, the connecting element 19, the inflow-side connection piece 32 and the wall 40 are omitted.

A controllable electric motor 7 is adapted to rotate an output shaft 36 about the center axis MA of the output shaft 36. A reduction gear 25 connects the electric motor 7 to the output shaft 36. Because the electric motor 7 performs only a rotary motion and is connected to the output shaft 36 via the reduction gear 25, the electric motor 7 is able to generate a higher torque than another motor with the same installation space. Moreover, the electric motor 7 does not need to perform an oscillating motion, but only a rotating motion always in one direction of rotation. The reduction gear 25 is protected from dirt particles and other environmental influences by a cover 26. The cover 26 is omitted in FIG. 4.

The output shaft 36 is guided through a rotatably mounted conversion component 41.1 and is connected to the conversion component 41.1 in a rotationally fixed manner. The axis of rotation and center axis MA of the output shaft 36 is also the axis of rotation of the conversion component 41.1. The conversion component 41.1 comprises a hollow camshaft 8, a cam disk 1 and a circular perforated disk (encoder disk) 11. The output shaft 36 is guided through an opening Ö in the camshaft 8. The contour of the opening Ö causes a positive connection between the output shaft 36 and the conversion component 41.1, see FIG. 8 and FIG. 12.

The cam disk 1 and the perforated disk 11 extend in two mutually parallel planes which are both perpendicular to the center axis MA. The rod 4 lies in the plane in which the cam disk 1 extends. The longitudinal axis LA of the rod 4 is perpendicular to the center axis MA. The compression spring 18 tends to press the tappet 17 against the peripheral contour (circumferential contour) of the cam disk 1 and to keep it in contact with this peripheral contour, even when the cam disk 1 is rotated.

Figure 5:
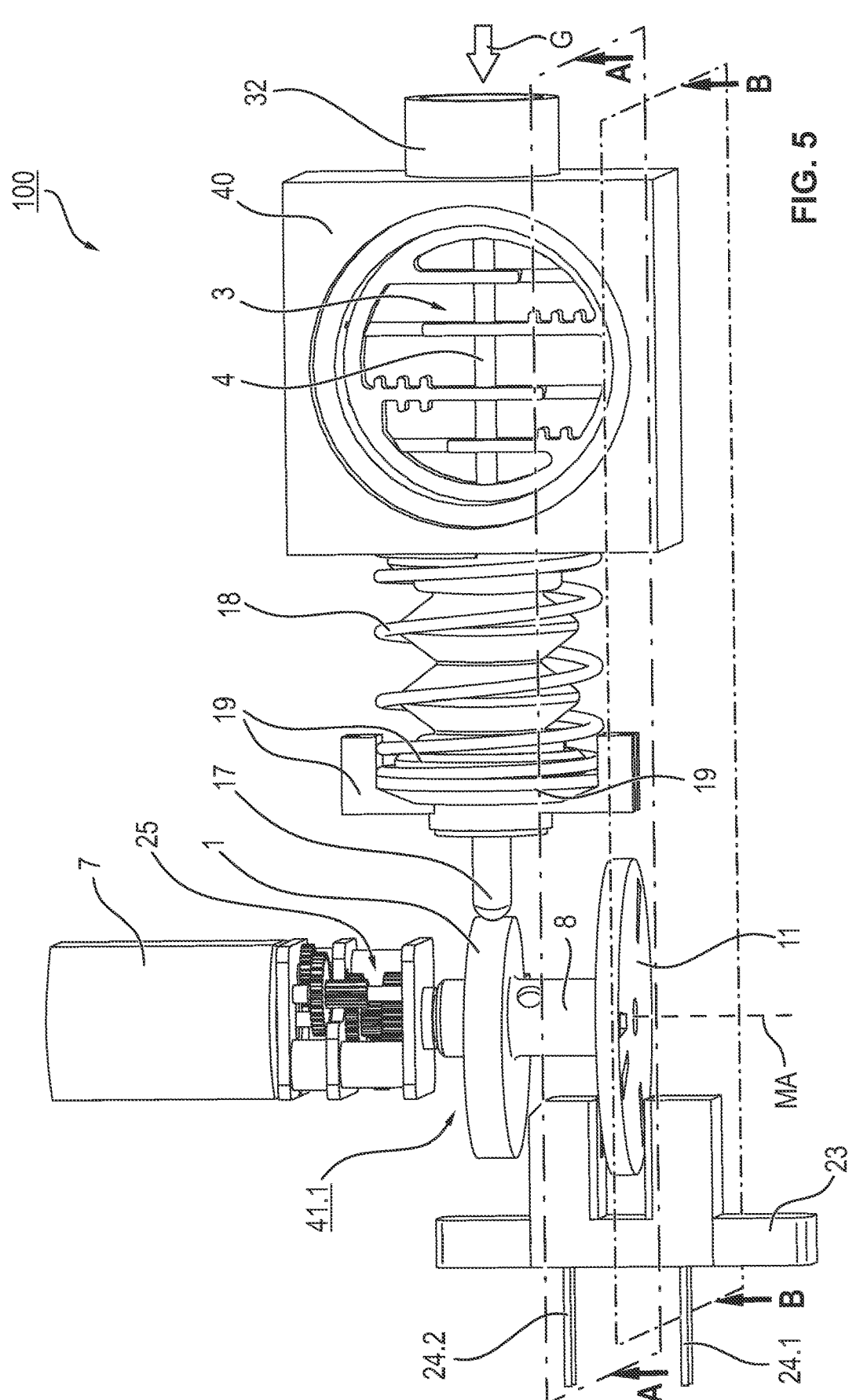
FIG. 5 is a top view showing the parts shown in FIG. 4 as well as the light barrier and the measuring chamber.
Figure 6:
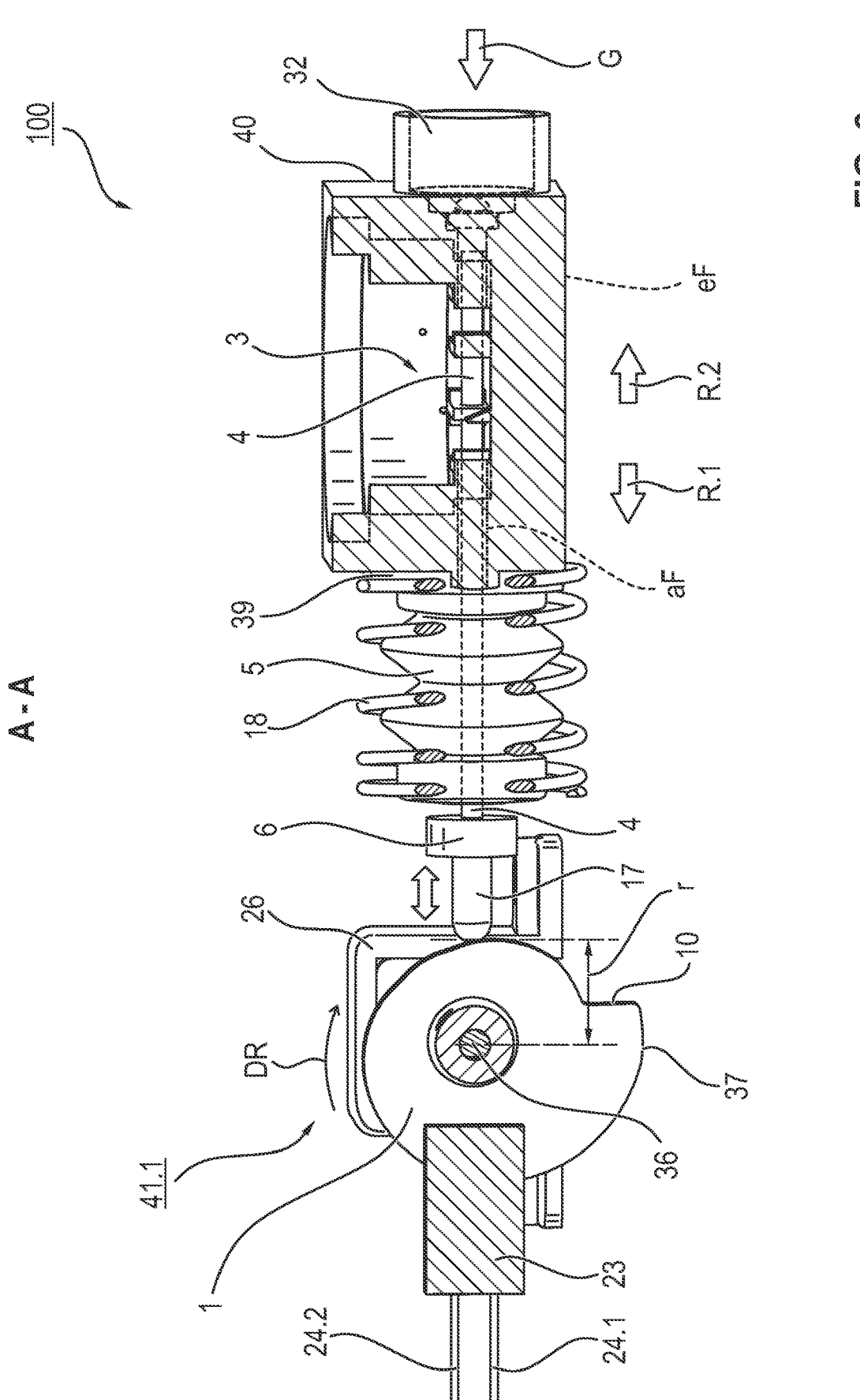
FIG. 6 is a vertical sectional view through the analyzer in the plane A-A of FIG. 5.

FIG. 5 shows a top perspective view of the analyzer 100 with the frame 9 and cover 26 omitted. FIG. 6 shows the analyzer 100 in the plane A-A of FIG. 5, FIG. 7 in the plane B-B. The center axis MA lies in the drawing plane of FIG. 5 and is perpendicular to the drawing planes of FIG. 6 and FIG. 7. The longitudinal axis LA lies in the drawing planes of FIG. 5, FIG. 6, and FIG. 7. FIG. 8 shows in a perspective view the conversion component 41.1 according to the first embodiment, with the cam disk 1 facing the viewer.

The output shaft 36 rotates the cam disk 1 in the direction of rotation DR about the center axis MA, namely in the clockwise direction in the example of FIG. 6 and FIG. 7. During this movement, the radius r of the cam disk 1 gradually increases from a minimum radius $r_{min}$ until the cam disk 1 reaches its maximum radius $r_{max}$. The radius r is understood to be the distance between the circumferential contour and the center axis MA measured at the point where the tappet 17 contacts the circumferential contour. In a segment 37, the peripheral contour of the cam disk 1 has this maximum radius $r_{max}$ throughout. The circumferential contour also includes an edge 10 in which the radius r changes abruptly, decreasing abruptly upon rotation in the clockwise direction of rotation DR.

Each rotational position of the cam disk 1 defines a position of the valve body 2 relative to the valve body seat 13. Also, each rotational position establishes a position of the plate 6 and thus a volume of the bellows 5. These two effects are achieved because, thanks to the compression spring 18, the tappet 17 and thus the rod 4 follow the circumferential contour of the cam disk 1, and because both the plate 6 and the valve body 2 are fixed to the rod 4.

FIG. 9 shows an example of this dependence. FIG. 9 is a schematic representation and not necessarily to scale. The rotational position α of the cam disk 1 relative to the tappet 17 is shown on the x-axis. A full rotation of the cam disk 1 is shown, where the rotation position α=0°=360° is a predetermined reference rotation position at which the tappet 17 has the smallest possible distance to the camshaft 8. On the left y-axis, the respective fixed radius r of the cam disk 1 at the respective rotation position α as well as the resulting position of the valve body 2 relative to the valve body seat 13 are shown, whereby the valve body position is represented as distance d and thus as the opening width of the valve 2, 13. This distance d is illustrated in FIG. 9 above. On the right y-axis the volume Vol of the bellows 5, which is determined by the respective rotation position α, is indicated. The rotation positions are chosen in such a way that the rotation position increases from 0° to 360°, which is why the x-axis also stands for the continuous time t. FIG. 9 shows the course of the edge 10 and the two segments 35 and 37.

The rotation position $\alpha=\alpha_{min}=0°$ of the cam disk 1 determines the following:

the smallest possible distance $d_{min}=0$ of the valve body 2 from the valve body seat 13, i.e. the fully closing end position, the minimum radius $r_{min}$ of the cam disk 1 and the maximum volume $Vol_{max}$ of the bellows 5.

The edge 10 is positioned at a rotational position $\alpha=\alpha_{max}$. The rotation position $\alpha=\alpha_{max}$ specifies the following:

the maximum distance $d_{max}$ of the valve body 2 from the valve body seat 13, i.e. the fully opening end position, the maximum radius $r_{max}$ of the cam disk 1 and the minimum volume $Vol_{min}$ of the bellows 5.

Initially, the cam disk 1 is in the rotation position $\alpha=0°$. At time $t_0$, the flush-triggering event is detected. The motor 7 is activated. The cam disk 1 is rotated until it assumes its maximum radius $r_{max}$ in the rotational position $\alpha_1$ and at time $t_1$ and the tappet 17 reaches segment 37. Upon further rotation, the tappet 17 slides over the segment 37, and the radius r remains at the maximum value $r_{max}$. The bellows 5 is in the state with minimum volume $Vol_{min}$. The cam disk 1 is preferably stopped.

At time $t_2$ the suction-triggering event is detected. The tappet 17 slides over the edge 10. The radius r decreases abruptly from $r_{max}$ to a smaller value $r_1$, which is still larger than the minimum radius $r_{min}$. The compression spring 18 expands and causes the volume of the bellows 5 to increase to the value $Vol_1$. As a result, a gas sample G is drawn through the fluid connection eF on the inflow side into the measuring chamber 3. The edge 10 can be arranged radially or even somewhat obliquely so that the tappet 17 temporarily loses contact with the cam disk 1. This reduces the friction between the tappet 17 and the cam disk 1.

With a further rotation of the cam disk 1, the radius r gradually decreases and the volume Vol of the bellows 5 increases until the minimum radius $r_{min}$ and the maximum volume $Vol_{max}$ are reached again. In the example of FIG. 9, the radius r remains constant in the period from $t_2$ to $t_3$, namely with the value $r_1$, and then decreases until it has become minimum again at the time $t_4$. The fact that the radius r maintains the constant value $r_1$ in the period from $t_2$ to $t_3$ even when the cam disk 1 is rotated is achieved by a segment 35, cf. FIG. 8.

Preferably, a signal processing control unit 15 is able to receive and process measured values from various sensors of the analyzer 100 and to activate and deactivate the electric motor 7. As a result, the electric motor 7 is operated in a start-stop mode depending on at least one of the events described above.

Initially, the electric motor 7 is deactivated and the cam disk 1 is not rotated. The flush-triggering event causes the control unit 15 to activate the electric motor 7 and the activated electric motor 7 to rotate the output shaft 36 and thus the conversion component 41.1 with the cam disk 1.

In one embodiment, the electric motor 7 remains activated until the cam disk 1 rotated by the electric motor 7 has completed one full rotation. The geometry of the peripheral contour of the cam disk 1 and the speed of rotation determine when the suction-triggering event and when the closing event have occurred.

In a preferred embodiment, however, the control unit 15 deactivates the electric motor 7 several times and activates it again while the electric motor 7 rotates the cam disk 1. This realizes an event-controlled operation. This is described below.

The electric motor 7 is deactivated again and the rotation of the cam disk 1 is interrupted when the rotation position is between the values $\alpha_1$ and $\alpha_{max}$, preferably close to the value $\alpha_{max}$. At the time $t_2$, the suction-triggering event is detected, and the electric motor 7 is reactivated and rotates the cam disk 1. As a result, and thanks to the edge 10, the volume Vol of the bellows 5 is abruptly increased from the minimum volume $Vol_{min}$ to the value $Vol_1$. The electric motor 7 continues to rotate the cam disk 1, for example up to rotation position $\alpha_3$, and is then deactivated again. Thanks to the segment 35, the radius r and the volume Vol remain at the same values $r_1$ and $Vol_1$, respectively, even when the cam disk 1 is rotating. At the time $t_3$, the event that the chemical reaction in the sensor 12 is completed is detected. This detection acts as the closing event. The electric motor 7 is activated again and rotates the cam disk 1 to rotation position $\alpha=0°$. The radius r is now again $r_{min}$, and the volume Vol is $Vol_{max}$.

Operational reliability in event-controlled operation is increased if a sensor measures the current rotational position of the cam disk 1. In the embodiment example, a perforated disk (encoder disk) 11 is mounted on the camshaft 8 in a rotationally fixed manner in addition to the cam disk 1. In the embodiment example, the camshaft 8, the cam disk 1 and the perforated disk 11 form a single component, namely the conversion component 41.1. At least one recess is formed into the perforated disk 11, preferably several recesses 42.1, 42.2, . . . . The perforated disk 11 interrupts the light beam of a light barrier 23 that generates and detects a light beam. The recesses 42.1, 42.2, . . . allow this light beam to pass. Two electrical contacts 24.1 and 24.2 supply the light barrier 23 with electrical energy. The control unit 15 receives a signal from this position sensor comprising the light barrier 23 and the perforated disk 11 and derives the current rotational position $\alpha$ of the cam disk 1.

Figure 10:
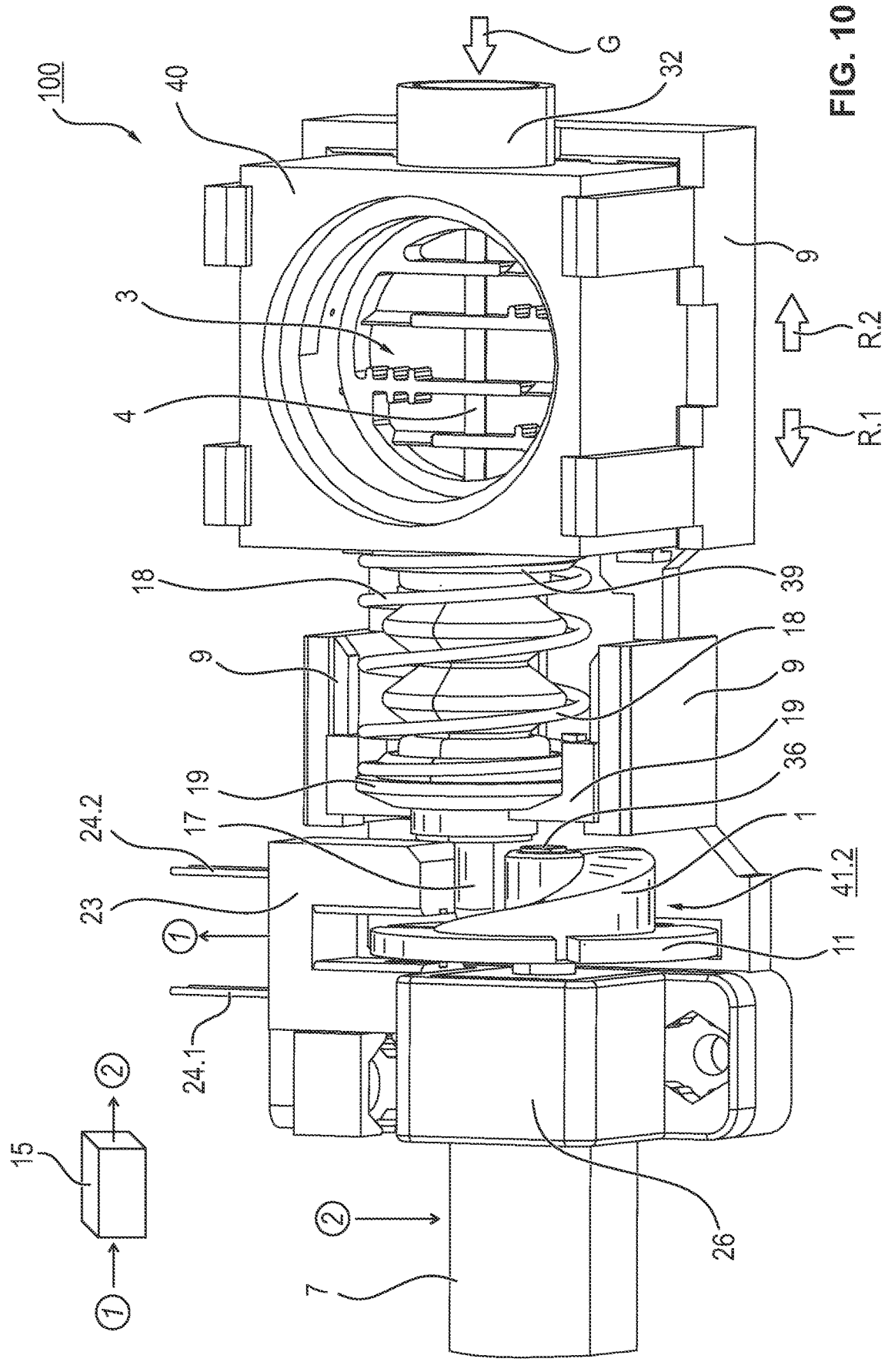
FIG. 10 is a perspective view obliquely from above showing an analyzer according to the invention according to a second embodiment.
Figure 11:
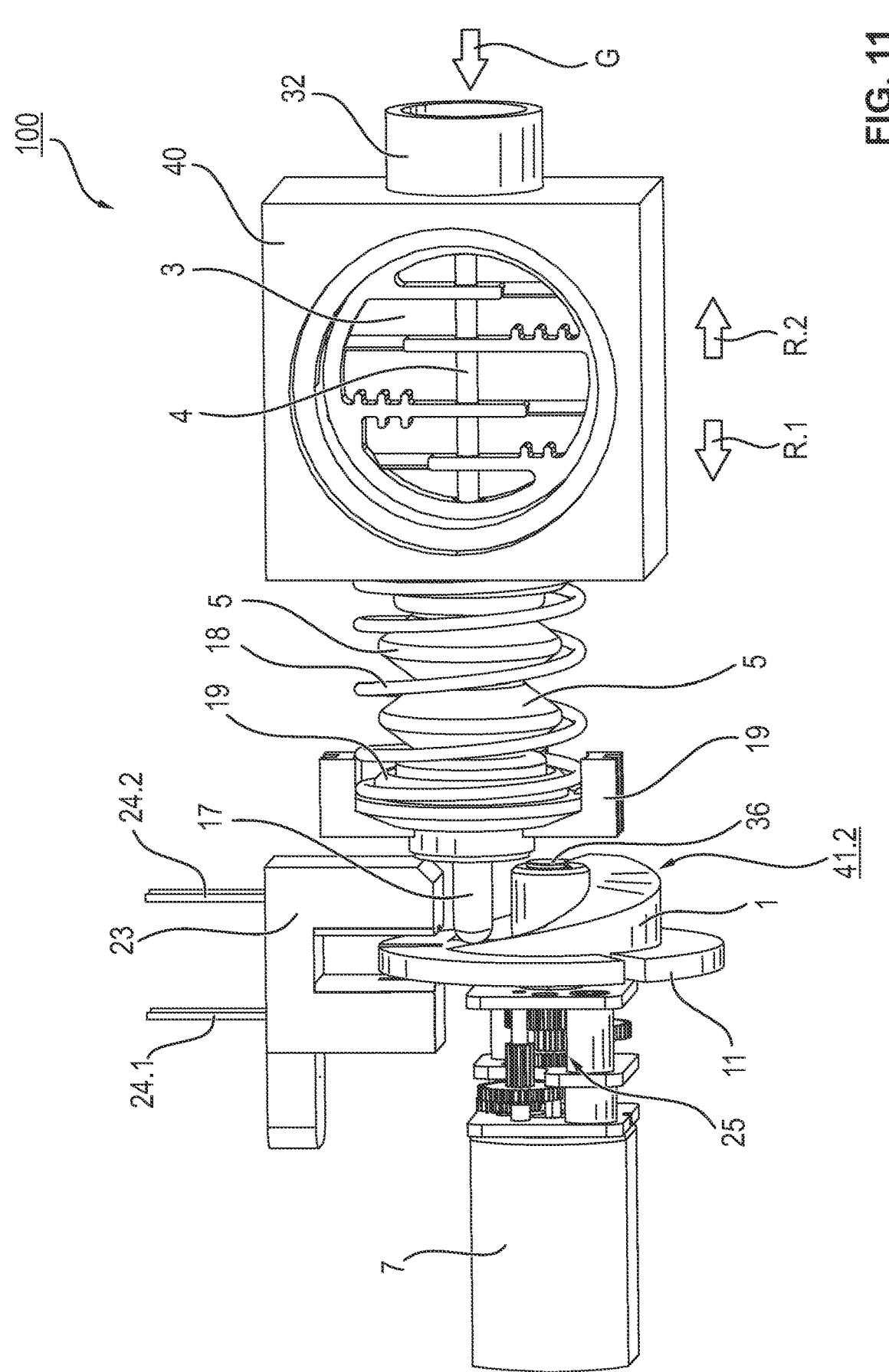
FIG. 11 is a perspective view from above showing the drive, the drive connection, the measuring chamber, and the light barrier of the analyzer of FIG. 10.

FIG. 10 to FIG. 15 show a second embodiment of the analyzer 100 according to the invention. FIG. 10 shows the second embodiment in a perspective view obliquely from above. FIG. 11 shows the second embodiment in a perspective view from above, with the frame 9 and the cover 26 omitted.

The second embodiment includes a conversion component 41.2 that takes the place of the conversion component 41.1 of the first embodiment. The second embodiment differs from the first embodiment as follows:

In the first embodiment, the center axis MA about which the conversion component 41.1 is rotatable is perpendicular to the longitudinal axis LA of the rod 4. In the second embodiment, the center axis MA about which the conversion component 41.2 is rotatable is parallel to the longitudinal axis LA of the rod 4 and is at a distance from this longitudinal axis LA.

In the first embodiment, the circumferential contour of the cam disk 1 moves the tappet 17 and thus the rod 4. In the second embodiment, on the other hand, a contour of the cam disk 1 extending in a plane Eb perpendicular to the center axis MA moves the tappet 17 and thus the rod 4. This contour of the cam disk 1 is referred to hereinafter as the surface contour.

In the first embodiment, a clearance occurs between the cam disk 1 and the perforated disk 11. In the second embodiment, the perforated disk 11 is connected to the cam disk 1 in a planar manner, perpendicular to the center axis MA.

Figures 12A, 12B:
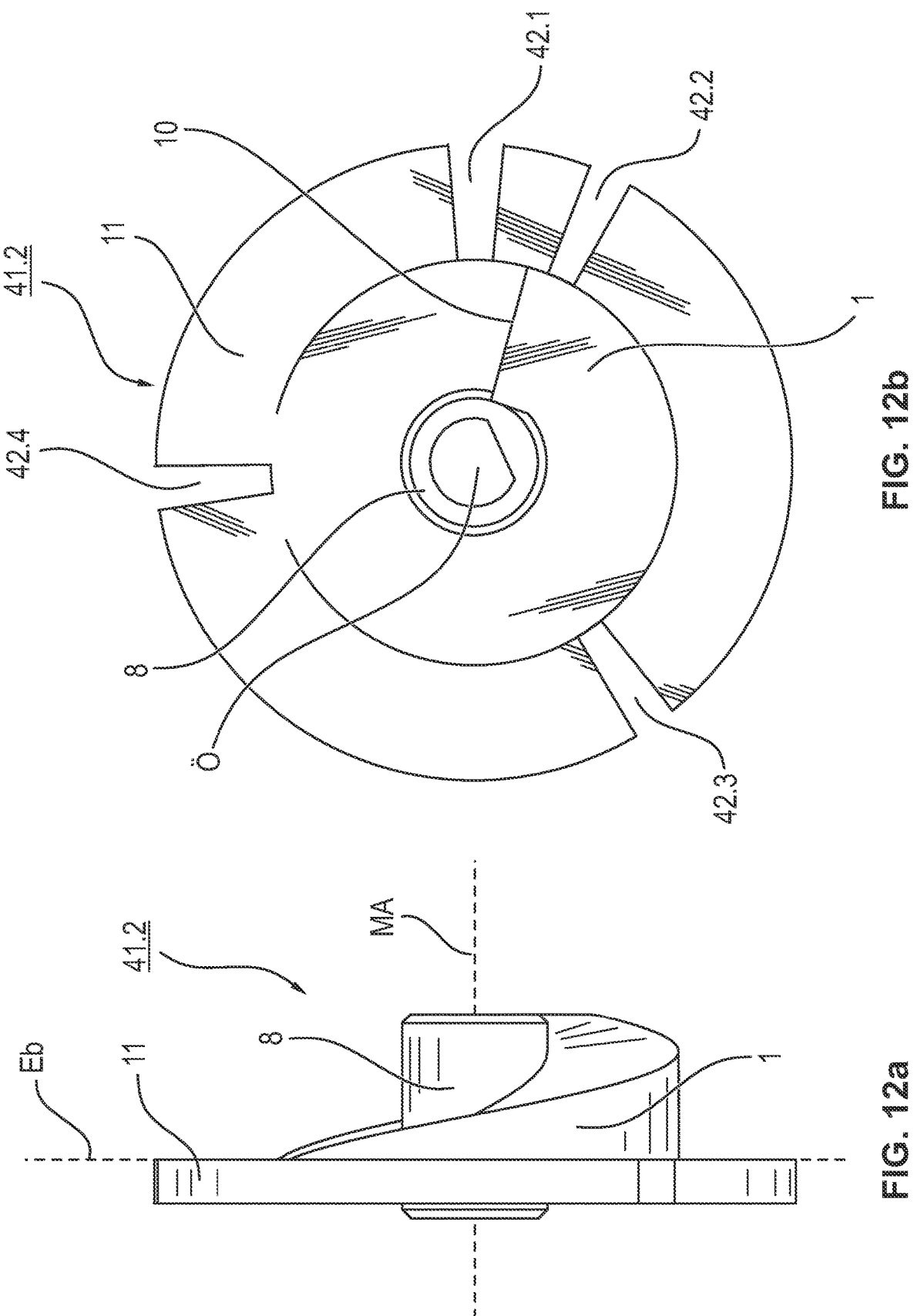
FIG. 12a is a side detail view showing the conversion component of the second embodiment.
FIG. 12b is a top detail view showing the conversion component of the second embodiment.
Figure 13:
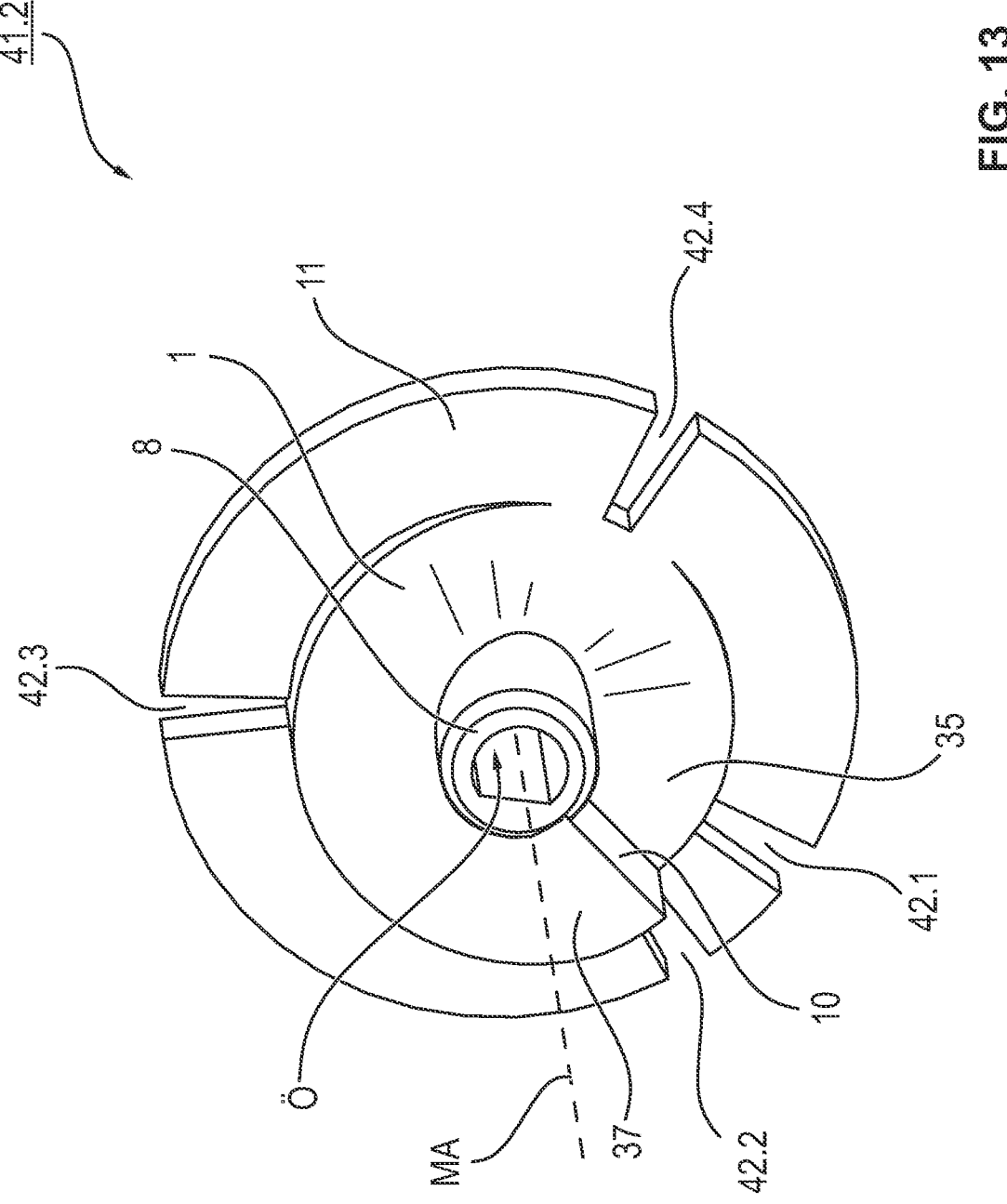
FIG. 13 is a perspective view showing the conversion component of FIGS. 12a and 12b.
Figure 14:
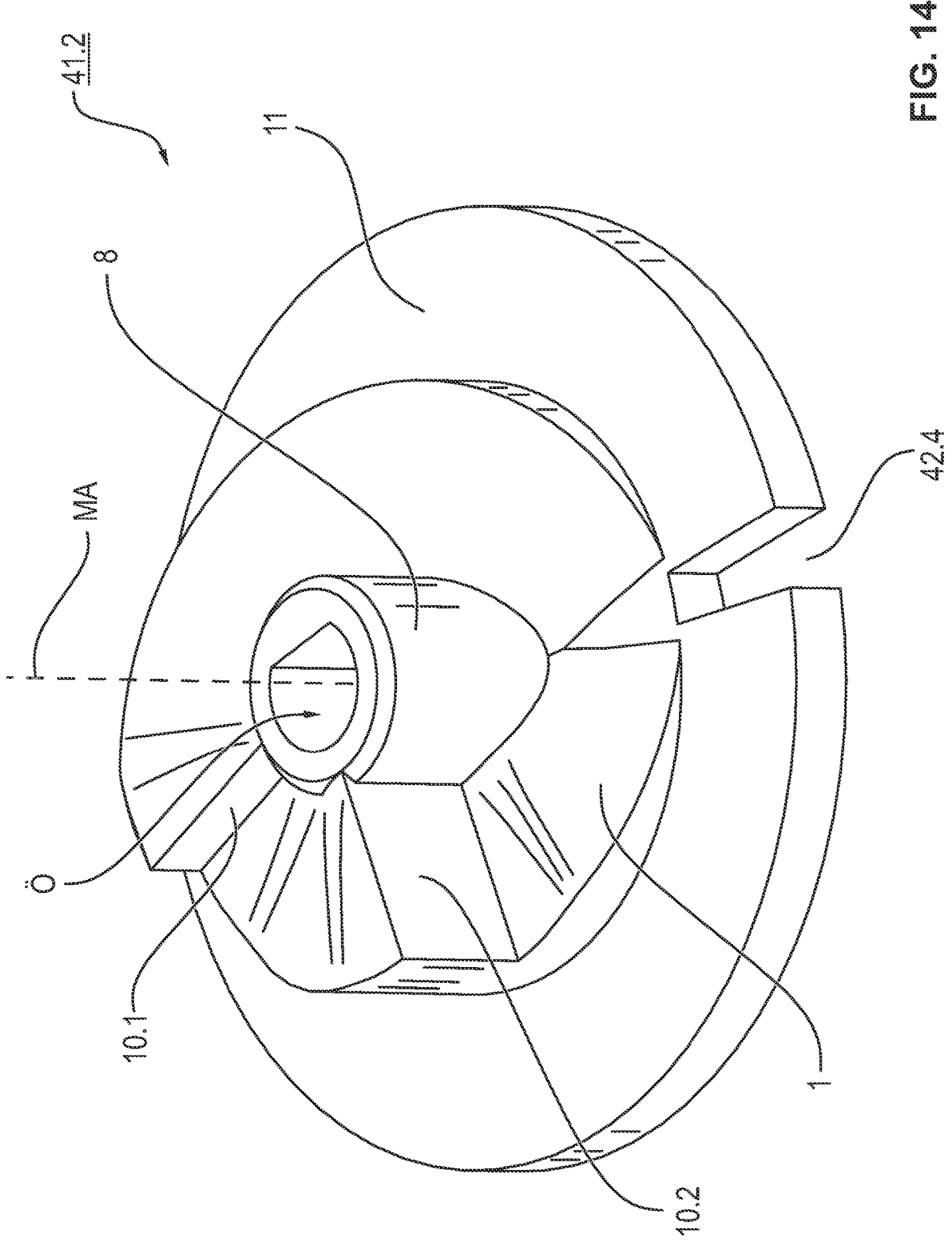
FIG. 14 is a perspective view showing the conversion component of the second embodiment with another realization form of the cam disk.
Figure 15:
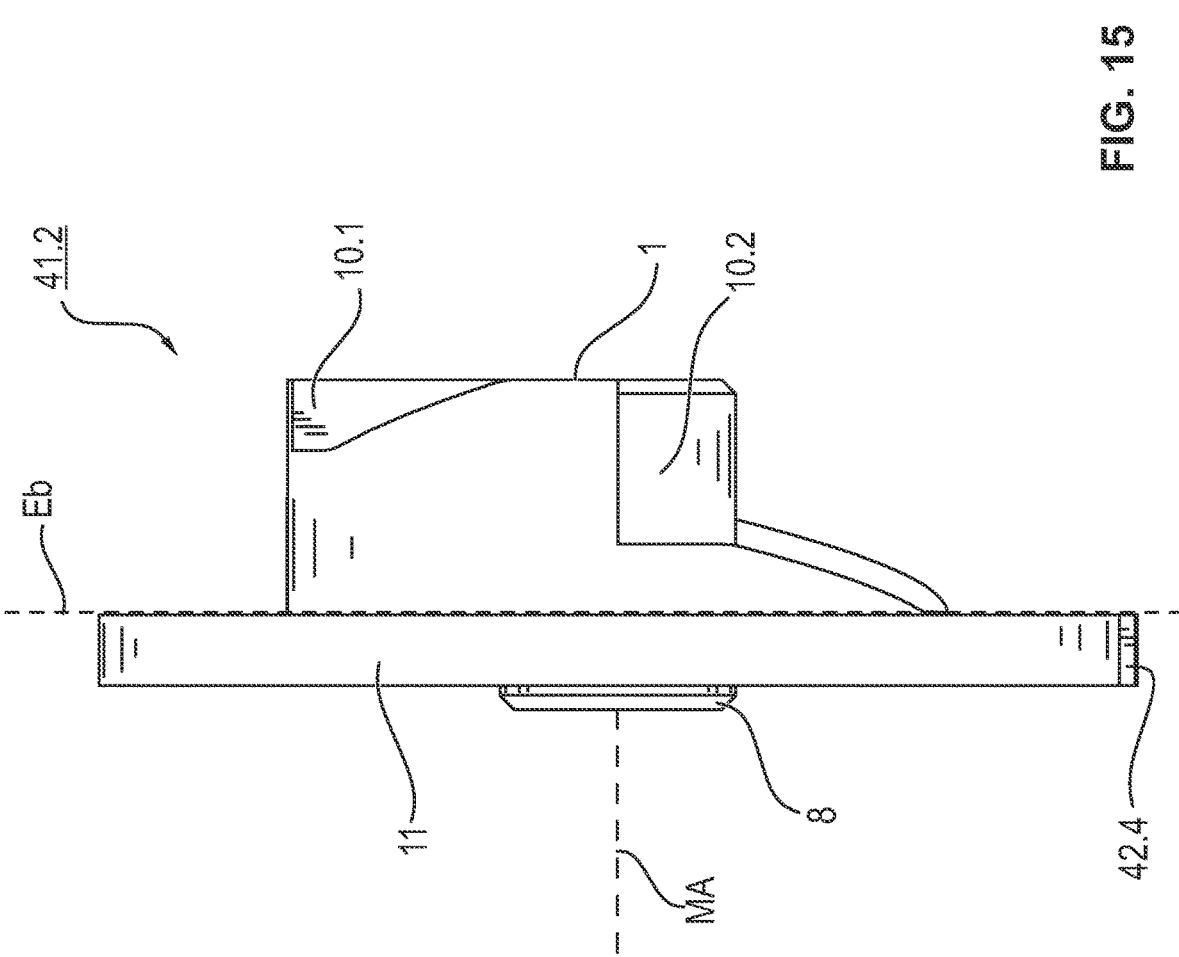
FIG. 15 is a side view showing the conversion component of FIG. 14.

FIG. 12*a* and FIG. 15 show the conversion component 41.2 from a viewing direction perpendicular to the center axis MA. FIG. 12*b* shows the conversion component 41.2 from a viewing direction parallel to the center axis MA, with the cam disk 1 facing the viewer. FIG. 13 and FIG. 14 each show a perspective view of the conversion component 41.2. Identical reference signs have the same meanings as in the first embodiment.

The surface contour also comprises an edge 10, 10.1, 10.2 and two segments 37 and 35. In the second embodiment, the radius r according to the first embodiment is replaced by the distance of the surface contour to the reference plane Eb which is perpendicular to the center axis MA, for example to that surface of the perforated disk 11 which faces the cam disk 1.

The conversion component 41.2 according to the second embodiment has a larger extension along the center axis MA than the conversion component 41.1 according to the first embodiment.

In the realization form according to FIG. 12 and FIG. 13 the cam disk 1 has one edge 10, in the realization form according to FIG. 14 and FIG. 15 it has two edges 10.1, 10.2. These two realization forms differ from each other as follows:

In the implementation form according to FIG. 12 and FIG. 13, one full rotation of the cam disk 1 about the axis of rotation MA causes the volume of the suction chamber unit 5, 6 to be increased once thanks to the edge 10, and as a result gas is sucked through the fluid connection eF on the inflow side into the measuring chamber 3 once.

In the implementation form according to FIG. 14 and FIG. 15, a full rotation of the cam disk 1 about the axis of rotation MA causes the volume of the suction chamber unit 5, 6 to be enlarged twice thanks to the two edges 10.1 and 10.2 and to be reduced again between the two enlargements. As a result, gas is sucked into the measuring chamber 3 twice, and in between the measuring chamber 3 is flushed.

The implementation form according to FIG. 14 and FIG. 15 allows two breath samples to be aspirated and examined from the same test person in succession, namely first a breath sample that the test person delivers at the beginning of the exhalation process and then a breath sample that the test person delivers towards the end of the exhalation process. The breath sample delivered first contains predominantly gas from the mouth, while the breath sample delivered subsequently contains gas from the lungs. The measuring chamber 3 is purged between these two aspiration processes so that the two gas samples can be analyzed independently of each other.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1 | Cam disk, non-rotatably connected to the camshaft 8, has a circumferential contour (first embodiment) or a surface contour (second embodiment), guides the tappet 17, has the edges 10, 10.2, 10.2, has the radius r, belongs to the conversion component 41.1, 41.2 |
| 2 | Conical valve body, connected to a free end of the rod 4, together with the sealing ring 13, forms a valve for the fluid connection on the inflow side eF |
| 3 | Measuring chamber, receives a gas sample to be analyzed, defines a region of a sensor, such as the sensor 12, and is defined by the wall 40 |
| 4 | Rod, extends along the longitudinal axis LA, is connected at one free end to the valve body 2 and at the other free end to the tappet 17 |
| 5 | Bellows capable of generating negative pressure and positive pressure in the measuring chamber 3 is pulled apart and compressed by the rod 4, has the volume Vol |
| 6 | Plate, capable of pulling apart and compressing bellows 5, fixedly mounted on rod 4 |
| 7 | Electric motor, rotates the output shaft 36 via the reduction gear 25 |
| 8 | Camshaft, non-rotatably connected to the cam disk 1 and the perforated disk 11, has the opening Ö through which the output shaft 36 is guided, belongs to the conversion component 41.1, 41.2 |
| 9 | Frame on which the other components of the gas detection device 100 are mounted |
| 10 | Single edge in the contour of the cam disk 1 |
| 10.1, 10.2 | Edges in the contour of cam disk 1 |
| 11 | Perforated disk (encoder disk), non-rotatably connected to camshaft 8, belongs to conversion component 41.1, 41.2 and to position sensor |
| 12 | Electrochemical sensor in the measuring chamber 300, comprising electrodes 20 and 21 and electrical contacts 33, 34, capable of detecting the concentration of breath alcohol in the measuring chamber sample Pr |
| 13 | Sealing ring around the rod 4, acts as a valve body seat for the sealing cone (valve body) 2, forms a valve together with the valve body 2 for the fluid connection on the inflow side eF |
| 14 | Further sealing ring, arranged around the sample inlet 16 |
| 15 | Signal-processing control unit, receives a signal from the light barrier 23 and controls the electric motor 7 |
| 16 | Sample inlet, on which the mouthpiece 30 can be placed, provides part of the fluid connection eF on the inflow side, is released or closed by the valve 2, 13 |
| 17 | Tappet (contact element) on a free end of the rod 4 |
| 18 | Compression spring, is configured to press the rod 4 against the circumferential contour (first embodiment) or surface contour (second embodiment) of the cam disk 1, is supported on the wall 40 |
| 19 | Connecting element between the tappet 17 and the plate 6, surrounds the rod 4 |
| 20 | Measuring electrode of the sensor 12, is contacted by the electrical contact 34 |

-continued

| | |
|---|---|
| 21 | Counter electrode of the sensor 12, is contacted by the electrical contact 33 |
| 22 | Electrical connection between contacts 33 and 34 |
| 23 | Light barrier, generates and detects a light beam which is interrupted by the perforated disk 11 and released through the recesses 42.1, 42.2, belongs to the position sensor |
| 24.1, 24.2 | Electrical contacts for the light barrier 23 |
| 25 | Reduction gear between the electric motor 7 and the output shaft 36 |
| 26 | Cover for reduction gear 25 |
| 28 | Electrolyte between the two electrodes 20 and 21 |
| 29 | Electrical measuring resistance between the two electrodes 20, 21 |
| 30 | Funnel-shaped mouthpiece, directs a gas sample G into the sample inlet 1 |
| 32 | Inlet-side connector, attached to the wall 40 of the measuring chamber 3, provides part of the inlet-side fluid connection eF |
| 33 | Electrical contact of the counter electrode 21 |
| 34 | Electrical contact of the measuring electrode 20 |
| 35 | Segment of the circumferential contour of cam disk 1 with constant radius $r_1$ |
| 36 | Output shaft, is rotated by the electric motor 7 about the center axis MA, is passed through the opening Ö in the conversion component 41.1, 41.2 |
| 37 | Segment of the circumferential contour of cam disk 1 with constant maximum radius $r_{max}$ |
| 38 | Current (amperage) sensor, measures the strength of the current flowing through the electrical connection 22 |
| 39 | Outflow-side connector, attached to the wall 40 of the measuring chamber 3, provides part of the outflow-side fluid connection aF |
| 40 | Wall of the measuring chamber 3, connected to the connection piece 32 on the inflow side |
| 41.1 | Conversion component according to the first embodiment, comprising the camshaft 8, the cam disk 1 and the perforated disk 11 spaced apart from the cam disk 1, rotatable about the center axis MA, non-rotatably connected to the output shaft 36 |
| 41.2 | Conversion component according to the second embodiment, comprising the camshaft 8, the cam disk 1 and the perforated disk 11 connected to the cam disk 1, rotatable about the center axis MA, non-rotatably connected to the output shaft 36 |
| 42.1, 42.2, . . . | Recesses in the perforated disk 11, allow a light beam from the light barrier 23 to pass through |
| 50 | Sensor arrangement, comprises a sensor 12 and a measuring chamber 3 |
| 100 | Analyzer, includes a sensor such as sensor 12, measurement chamber 3, motor 7, output shaft 36, conversion component 41.1, 41.2, rod 4, bellows 5, and plate 6 |
| 300 | Measuring chamber, receives a gas sample to be analyzed, defines a region of the sensor 12 |
| 400 | Wall of the measuring chamber 300 |
| A | Central axis of the wall 400 |
| aF | Fluid connection on the outflow side, connects the measuring chamber 3 with the bellows 5 |
| $\alpha$ | Rotational position of the cam disk 1, is measured by the position sensor 11, 23 |
| $\alpha_{max}$ | Rotation position in which the cam disk 1 has the maximum radius $r_{max}$ |
| d | Distance between valve body 2 and valve body seat 13 |
| $d_{max}$ | Maximum distance d, fully opening position of valve 2, 13 |
| DR | Direction of rotation in which the electric motor 7 rotates the conversion component 41.1 |
| Eb | Plane in which the surface contour of the cam disk 1 extends |
| eF | Fluid connection on the inflow side between the measuring chamber 3 and the mouthpiece 30 |
| G | Gas sample to be analyzed for breath alcohol contains the measuring chamber sample Pr, which is sucked into the measuring chamber 3 |
| LA | Longitudinal axis of the rod 4 |
| MA | Coinciding center axis of the output shaft 36 and the conversion component 41.1, 41.2 |
| Ö | Opening in the conversion component 41.1, 41.2 through which the output shaft 36 is guided |
| r | Radius of cam disk 1, measured at the point where tappet 17 contacts the circumferential contour of cam disk 1, varies along circumferential contour |
| $r_1$ | Radius of the cam disk 1 after the tappet 17 has slid over the edge 10 |
| $r_{min}$ | Minimum radius of cam disk 1, is reached at rotation position $\alpha = 0°$. |
| $r_{max}$ | Maximum radius of cam disk 1, is reached at rotation position $\alpha_{max}$ |
| R.1 | First direction in which the rod 4 is movable, a movement of the rod in the direction R.1 increasing the volume Vol of the bellows 5 |
| R.2 | Second direction in which the rod 4 is movable, a movement of the rod in the direction R.1 reducing the volume of the bellows 5 |
| Vol | Volume of the bellows 5, is changed by the rod 4 |
| $Vol_1$ | Volume of the bellows 5 obtained after the tappet 17 has slid over the edge 10 |
| $Vol_{max}$ | Maximum volume of bellows 5, is obtained at radius $r_{max}$ |
| $Vol_{min}$ | Minimum volume of bellows 5, is obtained at radius $r_{min}$ |

What is claimed is:

1. An analyzer for analyzing a gas for a predetermined substance, the analyzer comprising:
   a measuring chamber with an inflow side and an outflow side, said measuring chamber being configured to be at least temporarily in fluid communication on the inflow side with an environment of the analyzer;
   a sensor configured to measure an indicator of the amount and/or concentration of the substance in a gas sample located in the measuring chamber;
   a suction chamber unit with a variable volume;
   a cam disk configured to be rotatable about an axis; a motor configured to rotate the cam disk about the axis; and
   an actuating unit configured to be moved relative to the measuring chamber in a first direction and in a second direction opposite to the first direction, wherein the actuating unit is mechanically connected to the suction chamber unit such that movement of the actuating unit in the first direction is configured to increase the volume of the suction chamber unit and movement of the actuating unit in the second direction is configured to reduce the volume of the suction chamber unit, wherein the suction chamber unit is in fluid communication on the outflow side with the measuring chamber such that an increase in the volume of the suction chamber unit is configured to cause gas from the environment to be sucked into the measuring chamber through the fluid communication on the inflow side, and wherein a reduction in the volume of the suction chamber unit is configured to cause gas to be expelled out of the measuring chamber, and
   wherein the actuating unit is mechanically coupled to the cam disk such that each rotational position of the cam disk relative to the axis is configured to define a respective position of the actuating unit and thus a volume of the suction chamber unit.

2. An analyzer according to claim 1, wherein a first rotational position of the cam disk defines a maximum volume of the suction chamber unit, and a second rotational position of the cam disk defines a minimum volume of the suction chamber unit.

3. An analyzer according to claim 1, wherein the analyzer comprises a spring configured to press the actuating unit against the cam disk and thereby establish the mechanical coupling between the actuating unit and the cam disk or at least contribute to the mechanical coupling between the actuating unit and the cam disk.

4. An analyzer according to claim 1, wherein:
   the cam disk has a circumferential contour extending around the axis;
   a distance between the circumferential contour and the axis varies along the circumferential contour;
   the two directions in which the actuating unit is movable are perpendicular to the axis; and
   the actuating unit contacts the circumferential contour.

5. An analyzer according to claim 1, wherein:
   the cam disk has a surface contour which extends in a plane which is perpendicular to the axis;
   a distance between the surface contour and the plane varies over the surface contour;
   the two directions in which the actuating unit is movable are parallel to the axis; and
   the actuating unit contacts the surface contour.

6. An analyzer according to claim 1, wherein the cam disk, the actuating unit and the measuring chamber are arranged in a line.

7. An analyzer according to claim 1, wherein:
   the cam disk is configured such that a full rotation of the cam disk about the axis causes the actuating unit to be moved at least twice in succession in the first direction and at least once in the second direction;
   wherein the movement in the second direction takes place between the two movements in the first direction.

8. An analyzer according to claim 1, further comprising a valve movable between a closing end position and a releasing end position, the valve being configured to close in the closing end position the fluid communication on the inflow side and to release in the releasing end position the fluid communication on the inflow side, wherein:
   a movement of the actuating unit in the first direction causes the valve to be moved towards the closing end position and a movement of the actuating unit in the second direction causes the valve to be moved towards the releasing end position; or
   a movement of the actuating unit in the first direction causes the valve to be moved towards the releasing end position and a movement of the actuating unit in the second direction causes the valve to be moved towards the closing end position.

9. An analyzer according to claim 8, wherein:
   the actuating unit comprises a rod and a contact element; and
   the contact element is in contact with the cam disk and the rod connects the contact element to the valve.

10. An analyzer according to claim 1, further comprising a position sensor that is configured to measure an indicator of the rotational position of the cam disk relative to the axis.

11. An analyzer according to claim 10, further comprising a signal-processing control unit, wherein:
   the motor is configured to be activated and deactivated; and
   the control unit is configured to receive a signal from the position sensor and to activate and deactivate the motor depending on the signal from the position sensor.

12. An analyzer according to claim 10, wherein:
   the position sensor comprises a perforated disk and a light barrier that generates and detects a light beam; and
   the perforated disk is rotationally fixedly connected to the cam disk; and
   the perforated disk is configured to interrupt or release the light beam of the light barrier.

13. An analyzing process comprising the steps of:
   providing an analyzer, the analyzer comprising: a measuring chamber with an inflow side and an outflow side, said measuring chamber being configured to be at least temporarily in fluid communication on the inflow side with an environment of the analyzer; a sensor configured to measure an indicator of the amount and/or concentration of the substance in a gas sample located in the measuring chamber; a suction chamber unit with a variable volume; a cam disk configured to be rotatable about an axis; a motor configured to rotate the cam disk about the axis; and an actuating unit configured to be moved relative to the measuring chamber in a first direction and a second direction opposite to the first direction, wherein the actuating unit is mechanically connected to the suction chamber unit such that movement of the actuating unit in the first direction is configured to increase the volume of the suction chamber unit and movement of the actuating unit in the second direction is configured to reduce the volume of the suction chamber unit;

positioning the suction chamber unit in fluid communication on the outflow side with the measuring chamber; mechanically coupling the actuating unit to the cam disk such that each rotational position of the cam disk relative to the axis is configured to define a respective position of the actuating unit and thus a volume of the suction chamber unit;

increasing the volume of the suction chamber unit such that gas from the environment is sucked into the measuring chamber through the fluid communication on the inflow side; with the sensor, analyzing a gas sample emitted by a test person for a predetermined substance; and reducing the volume of the suction chamber unit such that gas is expelled out of the measuring chamber.

14. An analyzing process according to claim 13, wherein the gas sample is exhaled by the test person and the predetermined substance is alcohol.

15. An analyzing process for analyzing a gas for a predetermined substance using an analyzer, the analyzer comprising: a measuring chamber with an inflow side and an outflow side, said measuring chamber being in fluid communication on the inflow side with an environment of the analyzer; a sensor; a suction chamber unit with a variable volume; a motor; a cam disk configured to be rotatable about an axis; and an actuating unit configured to be moved relative to the measuring chamber in a first direction and a second direction opposite to the first direction, the analyzing process comprising the steps of: with the motor, rotating the cam disk about the axis; providing a mechanical coupling between the cam disk and the actuating unit to cause each rotational position of the cam disk relative to the axis to define a respective position of the actuating unit and thus a respective volume of the suction chamber unit; moving the actuating unit in the first direction to increase the volume of the suction chamber unit, which increase in volume of the suction chamber unit causes gas from the environment to be sucked through the fluid communication on the inflow side into the measuring chamber; with the sensor, measuring an indicator of the amount and/or concentration of the substance in a gas sample located in the measuring chamber; and moving the actuating unit in the second direction to reduce the volume of the suction chamber unit, which reduction of the volume of the suction chamber unit causes gas to be expelled out of the measuring chamber.

* * * * *